United States Patent
Pincus et al.

(10) Patent No.: US 6,282,583 B1
(45) Date of Patent: Aug. 28, 2001

(54) METHOD AND APPARATUS FOR MEMORY ACCESS IN A MATRIX PROCESSOR COMPUTER

(75) Inventors: Philip A. Pincus; Alan E. Charlesworth, both of Portland; Bradley R. Carlile, Tigard, all of OR (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 07/710,146

(22) Filed: Jun. 4, 1991

(51) Int. Cl.[7] ................................................. G06F 15/80
(52) U.S. Cl. ............................................ 709/400; 712/13
(58) Field of Search .................................... 395/425, 275, 395/375, 800, 200.06, 200.08, 477, 495; 709/400; 712/10, 11, 16, 3, 13

(56) References Cited

U.S. PATENT DOCUMENTS

| | | | |
|---|---|---|---|
| 4,498,134 | * 2/1985 | Hansen et al. | 712/13 |
| 4,789,925 | * 12/1988 | Lahti | 712/7 |
| 4,858,177 | * 8/1989 | Smith | 712/16 |
| 4,875,161 | * 10/1989 | Lahti | 711/157 |
| 4,905,143 | * 2/1990 | Takahashi et al. | 712/11 |
| 4,943,909 | * 7/1990 | Huang | 712/15 |
| 4,989,131 | * 1/1991 | Stone | 712/203 |
| 5,081,575 | * 1/1992 | Hiller et al. | 710/132 |
| 5,127,092 | * 6/1992 | Gupta et al. | 712/234 |
| 5,175,865 | * 12/1992 | Hillis | 712/13 |
| 5,197,130 | * 3/1993 | Chen et al. | 712/3 |
| 5,230,079 | * 7/1993 | Grondalski | 712/18 |
| 5,276,893 | * 1/1994 | Savaria | 714/10 |
| 5,434,995 | * 7/1995 | Oberlin et al. | 709/400 |
| 5,448,732 | * 9/1995 | Matsumoto | 709/104 |

OTHER PUBLICATIONS

Enslow; Multiprocessors and Parallel Processing; pp. 39–49, 76,77,211–217, 1974.*
Kober et al.; SMS—A Multiporocessor Architecture for High Speed numerical Calculations; pp. 18–24, 1978.*
Low–Cost device for Contention–Free Barrier Synchronization; IBM TDB; vol. 31, No. 11; pp. 382–389, Apr. 1989.*
Device That Provides for Contention–Free Barrier Synchronization in a Multiprocessor; IBM TDB; vol. 32, No. 1; pp. 260–262, Jun. 1989.*
Carlile; Algorithms and Design; The CRAY APP Shared–Memory System; COMPCON Spring '93 IEEE Computer Society Int'l Conf.; pp. 312–320, 1993.*

\* cited by examiner

Primary Examiner—Kenneth R. Coulter
(74) Attorney, Agent, or Firm—Schwegman, Lundberg, Woessner & Kluth, P.A.

(57) ABSTRACT

A matrix processor comprises a system with a variable number of buses, each bus having a variable number of processing elements which may operate in parallel. Each bus accesses a port into a memory crossbar and a multiport memory system also accesses crossbar ports. Efficient sharing of bus accesses by processors and synchronization of processors on each bus is accomplished via registers located on the buses, which may be read and written by processors. Interbus synchronization is also accomplished via register accesses. The matrix processor may be configured as a coprocessor or as a stand alone device. A method of synchronizing the processors and buses, performed by at least one processor on at least one bus, includes reading a barrier state of the processors, synchronizing the processing elements on a each bus, reading the barrier state of the buses, and synchronizing each bus.

32 Claims, 22 Drawing Sheets

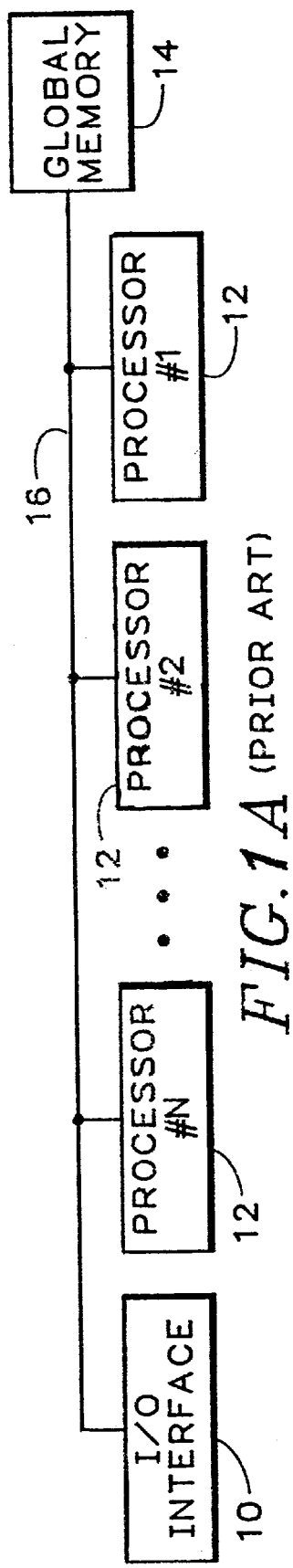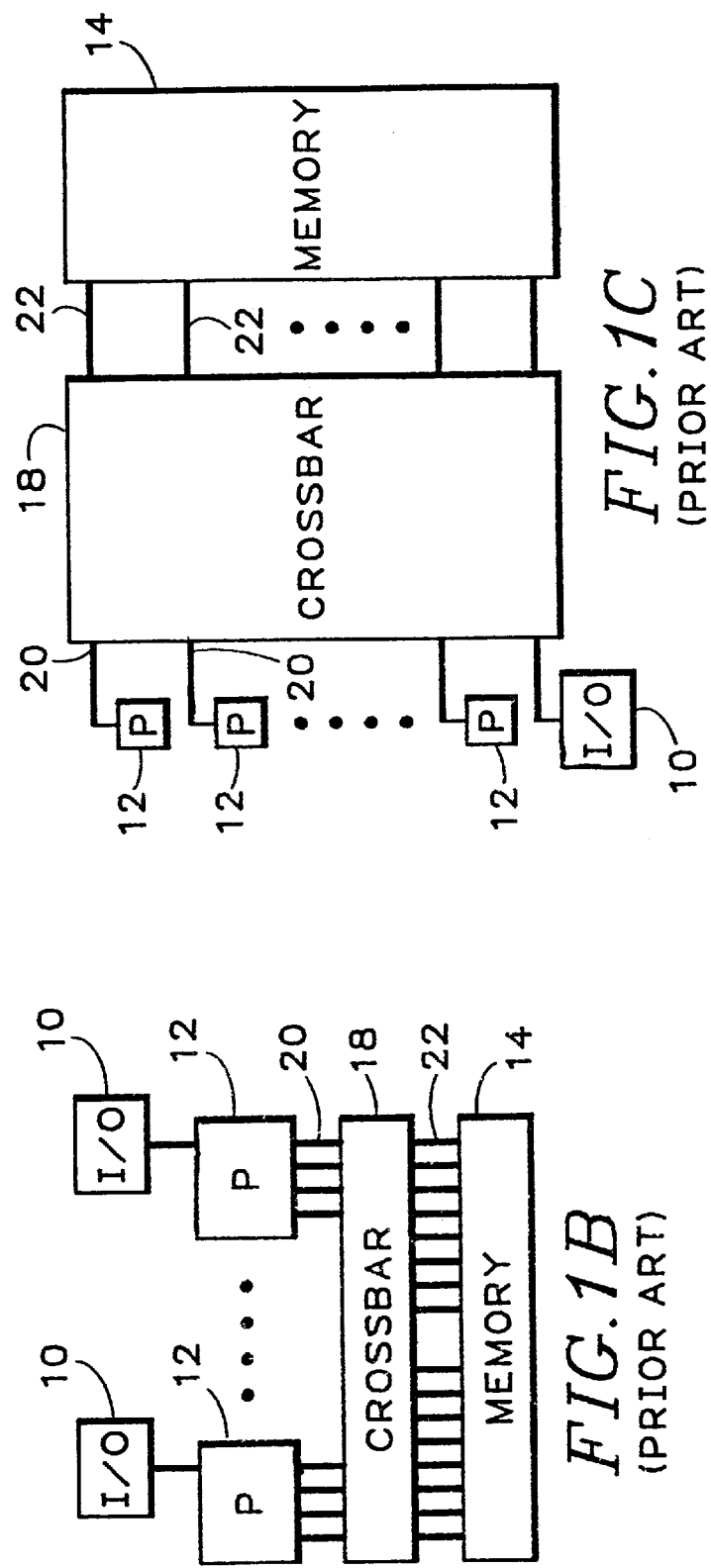

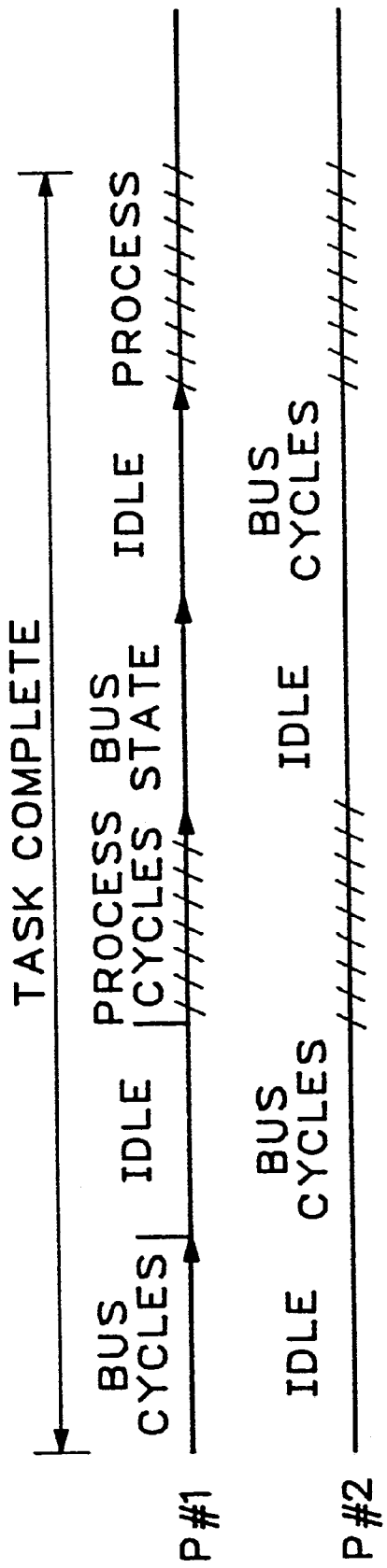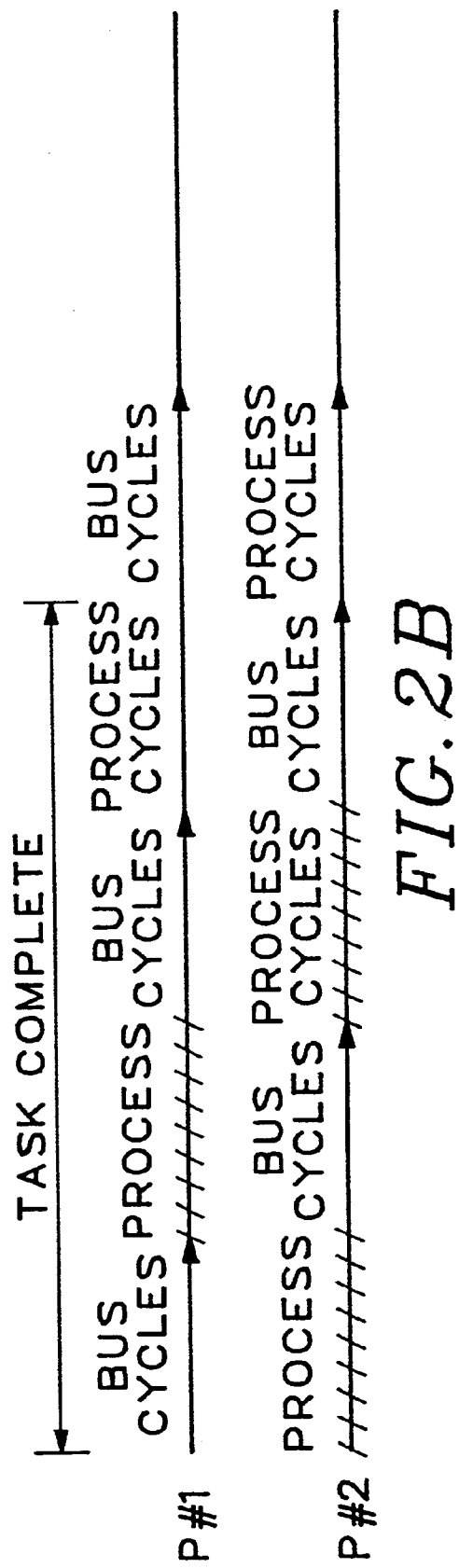

METHOD AND APPARATUS FOR MEMORY ACCESS IN A MATRIX PROCESSOR COMPUTER

BACKGROUND OF THE INVENTION

The present invention relates to a computer system and particularly to a parallel processor system adapted to carrying out computationally intensive procedures.

A number of computer applications involve executing scientific algorithms on large arrays of data. Such algorithms are commonly referred to as matrix algorithms and have several significant characteristics: they typically operate on multi-dimensional data arrays, they can be naturally paralleled and may be broken down into blocks, and they involve many computations per data point. Since most general purpose computer systems are adapted to single scalar operations and do not perform array computations efficiently, special computer architectures have been developed that reduce the time necessary to process large arrays of data. However, array processing for complex algorithms is still comparatively time consuming.

Traditional vector supercomputers perform matrix algorithms by decomposing them into a series of vector instructions, reading a vector from memory, performing an arithmetic operation such as a multiply-add, and storing the result back into memory. Operating in this manner often results in only two floating-point operations for every three memory accesses. In order to increase the operation speed of such a series of vector operations, faster memory systems can be employed, but faster memory systems can be prohibitively expensive. Memory bandwidth, i.e., the ability to move data between memory and processors, is typically the greatest expense in building a computer system.

There are many other factors that limit the speed at which a computer system can process an array of data. However, eliminating computer speed roadblocks in certain areas does not always yield the most cost effective means for increasing processing power. Sophisticated board technologies can minimize capacitance, propagation delays and noise, but the goal in developing computer systems is often to achieve high performance at low cost, providing the simplest means for implementing application software.

Another alternative for increasing overall computer processing capacity is increasing the number of processing elements used in the system. Employing twice the number of processors has the potential of reducing process time by a factor of two over a single processor system. However, depending on the application, the time required to perform an algorithm may not be reduced in proportion to an increase in the number of processing elements. Since many computer applications require completion of a first operation before a second operation can begin, a second processor that would normally perform the second operation often must remain idle until the first operation is finished. Such requirements can result in the dual processor computer system requiring approximately the same time to complete a procedure as would be required by a single processor system.

Computer architectures can also limit processing capacity in that bottlenecks during data transfer can cause processing elements to idle. For example, in a single bus computer system, only one processor may access system memory at a time, while other processors connected to the bus idle until the processor presently using the bus completes its transfer. One method of reducing system bottlenecks is to provide computer architectures that perform a few specific algorithms quickly, but their application is limited. Computer bottlenecks may also be reduced by adding buses and allowing multiple accesses to memory at the same time. These methods add cost and complexity to the system and are still restricted by the type of algorithms performed.

Bus conflicts may be reduced with software employing machine code that will coordinate memory accesses for plural processors in a system. However, this method can become too complex to perform effectively as the number of processors increases and, in addition, the software must be rewritten for each system configuration change. Using semaphores for system coordination is counterproductive because accesses to system memory for reading and setting semaphores consume precious memory bandwidth.

A substantial problem encountered with computers employing multiple processors involves tracking the processors and the points at which a data bus is available for subsequent data transmission to global memory. Software compilers for sorting the data and processing commands to each processor have been employed in an attempt to maximize processing capacity by reducing data bus conflicts. However, as the number of processors increases, the multiprocessor compilers become less efficient in allocating bus time between processing elements. Since the bus use for each processor depends on the algorithm that is presently being performed, software apportionment is complex and it is difficult to attain maximum system processing capacity.

FIG. 1A illustrates a multiprocessor bi-directional bus architecture system with a common global memory as found in the prior art. Interface processor 10, multiple data processing elements 12, and global memory 14 are all connected to bus 16. Instruction data will typically enter the system on bus 16 from mass storage through I/O processor 10. Processor 10 transmits incoming code into the global memory 14. Data for each processor is also transmitted over bus 16 to global memory 14. Each processor may perform a portion of the entire algorithm, or depending on the algorithm and the amount of data, may perform the same algorithm on a different section of the data.

The system of FIG. 1A illustrates typical architecture for a multiprocessor work station. Such a work station employs inexpensive bus architecture, thereby providing an economical system. However, the single bus between the central processing units and memory impedes serious supercomputing.

Referring now to FIG. 1B, also comprising a block diagram of a vector supercomputer in accordance with the prior art, a plurality of processors 12 are each coupled to a separate I/O interface 10 and also connect to crossbar 18 via multiple crossbar/processor ports 20, each processor coupling to one or more crossbar/processor ports 20. The crossbar connects the processors to memory 14 through multiple crossbar/memory ports 22. Crossbar 18 employs a complex multi-layered crossbar scheme according to the prior art for connecting the multiple processors 12 to memory bank 14. This complex crossbar and the memory interconnections required for such a system configuration, while effective in enhancing system performance, can be prohibitively expensive.

FIG. 1C is a block diagram of a relatively simpler computer system illustrating a prior art architecture for increasing bandwidth by allowing concurrent access to multiple ports in the same global memory array. Crossbar 18 connects multiple data processing elements 12 to global memory 14 by means of crossbar/processor ports 20 and crossbar/memory ports 22, each processor having its own dedicated crossbar/processor port. Memory 14 is provided with multiple input ports, each memory port being coupled to a single crossbar/memory port. Crossbar 18 decodes address values from each processor, connecting the data bus of the processing element that asserted a value on an address bus to the associated memory port in memory 14. The data on the processor data bus is transferred to or from the memory location through the memory port associated with the address value. An I/O interface 10 is also provided with a crossbar port. While such a system provides increased processing speed, the cost associated with supporting memory transfer bandwidth for each processor on the multiple memory ports is high relative to the gained computing speed. The systems of FIG. 1B and FIG. 1C illustrate typical structures wherein one or more crossbar ports are dedicated to each processor.

SUMMARY OF THE INVENTION

The present invention relates to a computer system including multiple processing elements connected to a bus and having plural bus/processor combinations connected via a crossbar to a multiple port memory system. A system interface is coupled to one port of the memory system for connecting to external devices or host computers. The system provides the ability of synchronizing the processing elements on a single bus, and also provides synchronizing ability with regard to multiple buses, to enable efficient bus usage.

The matrix processor system according to the present invention capitalizes on the fact that many algorithms incorporate processes that require multiple clock cycles to perform. These compute-intensive operations, referred to herein as matrix operations, may include, but are not limited to, computations involving matrices. Sequencing multiprocessor systems so that processors use common buses, while other data processors are performing computations, minimizes idle time for all processing elements in the system. Employing the same concept of processor synchronization on a bus level (as between buses) increases processing capacity. A multiple node processing system (wherein a node is defined as a bus and a plurality of processors it interconnects) allows concurrent accesses to memory, reducing bus conflicts and increasing system processor to memory bandwidth. The matrix processor system according to the present invention reduces internode memory conflicts by synchronizing the processors on different system nodes.

The present invention, by synchronizing a variable number of processors in hardware, allows the same application software to be used effectively without regard to the system processor configuration, i.e. with changes in system configuration. Large numbers of processors can be employed concurrently without the software programmer having to spend time coordinating and maximizing processor efficiency. The present system performs data bus allocation in hardware with minimal software control, enabling a sequencing process that does not have to be redesigned for each algorithm and that does not become less effective with an increase in the number of processors.

It is therefore an object of the present invention to provide an improved multiple processor computer system.

It is another object of the present invention to provide an improved computer system adapted to perform matrix computations in a rapid manner.

It is also an object of the present invention to provide an improved computer system that achieves high computation rates with minimal cost.

It is still another object of the present invention to provide a method of synchronizing a multiple processor computer system.

It is a further object of the present invention to provide an improved computer system which performs matrix algorithms more efficiently and at a lower cost.

It is another object of the present invention to provide an improved computer system which may be configured in response to the compute intensity of applications to be performed.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1A is a block diagram of a single bus multiple element computer architecture in accordance with the prior art;

FIG. 1B is a block diagram of a vector supercomputer in accordance with the prior art;

FIG. 1C is a block diagram of a prior art computer system with concurrent access by multiple processors to multiple ports in the same global memory array;

FIGS. 2A–2C are timing diagrams illustrating processing and bus access cycles for several processor configurations;

DETAILED DESCRIPTION

Figure 2C:
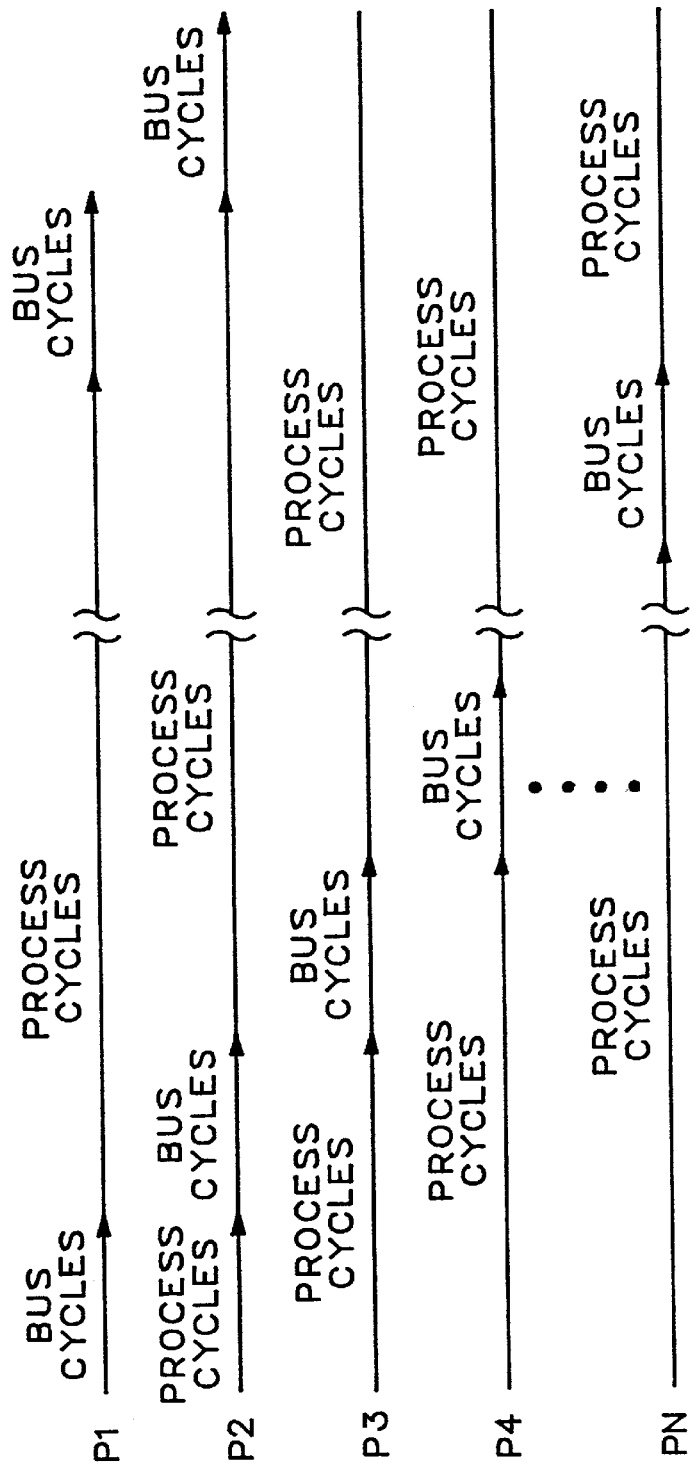

Equation 1 is a typical scalar algorithm that would be loaded into the instruction cache of a single instruction per clock processing element of a computer system.

$$X=(A*B)+(C-D) \tag{1}$$

In a single processor system (e.g. FIG. 1A without processors P#2 through P#N) X would be derived in the following manner, in a sequence of clock periods:
Assume A, B, C, and D already exist in global memory 14.

clock 1: load A into P#1 (Processing Element #1)
    clock 2: load B into P#1
    clock 3: load C into P#1
    clock 4: load D into P#1
    clock 5: multiply A*B, store in P#1 register
    clock 6: subtract C−D, store in P#1 register
    clock 7: add register A*B to register C−D, obtain X
    clock 8: store X in global memory 14

As an attempt to reduce the number of clock cycles required to perform equation 1, another processor may be added to the system. If data processor 1 (P#1) and data processor 2 (P#2) are both single instruction per clock processors connected to bus 16, X may be calculated in the following manner:

| clock 1: | load A into P#1 | bus cycles |
| --- | --- | --- |
| clock 2: | load B into P#1 | |
| clock 3: | load C into P#2 | |
| clock 4: | load D into P#2 | |
| clcok 5: | multiply A * B, store in P#1 | process cycles |
| | subtract C − D, store in P#2 | |
| clock 6: | transfer P#2 result to memory | bus cycles |
| clock 7: | transfer P#2 result from memory to P#1 | |
| clock 8: | add A * B with C − D in P#1 | process cycle |
| clock 9: | store X in global memory 14 | bus cycle |

Performing the multiplication and the subtraction in parallel does not reduce the total time necessary to carry out the algorithm. Further, having additional processors connected to bus 16 would not reduce the number of processing steps required to calculate X, since all available data elements are being used. To implement equation 1, seven bus cycles are necessary, while only two processor clock cycles are needed. Therefore, the time required to complete the algorithm is limited by the number of clock cycles needed to move data between global memory 14 and data processors P#1 and P#2. The algorithm in equation 1 is not well adapted for multiprocessing since processor P#1 and processor P#2 cannot operate at full capacity. For example, for the nine clock cycles required to carry out the algorithm, processor P#1 is only active during clocks 1, 2, 5, 7, 8, and 9 while processor P#2 is only active during clocks 3, 4, 5, and 6. Thus, in implementing equation 1, processors P#1 and P#2 are operating at 56% efficiency.

The present invention increases processor efficiency by interleaving bus cycles with calculation cycles. For example, in many computer applications the variables used in algorithms are not single numbers (scalars) but represent sets of values (vectors) wherein the same operation is conducted for each data value in the vector. If operands A and C in equation 1 were vectors instead of scalar numbers the algorithm is represented by equation 2, where N is a integer representing the number of data elements in vectors A and C: DO i=1, N $$X(i)=\{A(i)*B\}+\{C(i)-D\}$$

ENDDO

Equation 2

For a single processing element, the number of steps necessary to complete the algorithm of equation 2 is increased proportionally by the size of each data vector resulting in computation as follows:

Clock 1: load B into P#1
    Clock 2: load D into P#1
DO i=1, N
    Clock 3: load A(i) into P#1
    Clock 4: load C(i) into P#1
    Clock 5: multiply A(i)*B, store in P#1 register
    Clock 6: subtract C(i)−D, store in P#1 register
    Clock 7: add register A(i)*B with register C(i)−D, get X(i)
    Clock 8: store X(i) in global memory 14
ENDDO For a value of N equal to 100, the number of processing steps increases from eight to 2+(100*6)=602 processing steps. Employing data processor P#2 to compute a portion of the algorithm results in the computation method as follows:

Clock 1: load B into P#1
    Clock 2: load D into P#2
DO i=1, N
    Clock 3: load A(i) into P#1
    Clock 4: load C(i) into P#2
    Clock 5: multiply A(i)*B, store in P#1 register subtract C(i)−D, store in P#2 register
    Clock 6: transfer P#2 result to memory
    Clock 7: transfer P#2 result from memory to P#1 register
    Clock 8; add register A(i)*B with register value C(i)−D
    Clock 9: store X(i) in global memory 14
ENDDO The number of processing steps increases to 2+(100*7)=702 clocks. Due to the limited number of arithmetic operations in accordance with the algorithm the process time is again limited by the number of bus cycles required to transfer data between the processing elements and memory 14. Thus, adding additional processors to the system will not reduce the time required to complete the algorithm.

A second method for carrying out the algorithm is to take advantage of the algorithm redundancy. When the algorithm in equation 2 conducts the same mathematical operation on each data element without dependency upon intermediate or associated vector elements, sections of the array may be processed concurrently. For example, since the first element in the result vector is $X(1)=\{A(1)*B\}+\{C(1)-D\}$, and the second element in the result vector is $X(2)=\{A(2)*B\}+\{C(2)-D\}$, X(1) is independent of the operands or the value of X(2). This means that X(1) and X(2) may be processed concurrently by independent CPUs. Therefore, taking advantage of the redundancy, the algorithm is executed as follows:

| Clock 1: | load B into P#1 | |
| --- | --- | --- |
| Clock 2: | load D into P#1 | |
| Clock 3: | load B into P#2 | |
| Clock 4: | load D into P#2 | |
| DO i = 1, 50 | | |
| Clock 5: | load A(i) into P#1 | ⎫ |
| Clock 6: | load C(i) into P#1 | ⎬ bus |
| Clock 7: | load A(i + 50) into P#2 | ⎬ cycles |
| Clcok 8: | load C(i + 50) into P#2 | ⎭ |
| Clock 9: | multiply A(i) * B, store in P#1 register | |
| | multiply A(i + 50) * B, store in P#2 register | |
| Clock 10: | subtract C(i) − D, store in P#1 register | ⎫ process |
| | subtract C(i + 50) − D, store in P#2 register | ⎬ cycles |
| Clock 11: | add register A(i) * B to register C(i) − D | |
| | add register A(i + 50) * B to register C(i + 50) − D | ⎭ |
| Clock 12: | store X(i) in memory | ⎫ bus |
| Clock 13: | store X(i + 50) in memory | ⎬ cycles |

ENDDO

The number of clocks to perform the operation is 4+(50*9)=454 clocks. This method requires less time than the previous method and additional processors can be added to the system to further reduce processing time. Ideally, for maximum speed each processor added onto bus 16 would increase the speed by a factor of one (two processors=twice as fast, three processor=three times as fast, etc.). However, processing speed is still restricted by the number of clock cycles required to move data between the processing elements and global memory and as the number of processors added to the system is increased, the efficiency gain realized from each subsequent processor is reduced. For example, adding a third processor will increase the number of bus cycles from six to nine while only reducing the iteration count of the do loop by seventeen. The total number of clocks necessary to perform equation 2 with three processors is then 6+(33*12)=402 clocks. Thus, the cost effectiveness of adding another processor is reduced.

Notice that for a two processor system, processors P#1 and P#2 are each only operating for six of the nine clock cycles in the vector loop (e.g. 66% efficiency). If the efficiency of each processor can be increased, the time required to perform the algorithm is reduced without adding hardware to the system. Since the bus is not used during the three clock cycles while data is being processed (clocks 9, 10, 11), sequencing the two processors so that data transfers are performed during processing cycles increases processor efficiency thereby reducing the number of clock cycles necessary to complete the algorithm in equation 2 without adding additional hardware. The timing sequencing for equation 2 is modified to the following:

Clock 1: load B into P#1
Clock 2: load D into P#1
Clock 3: load B into P#2
Clock 4: load D into P#2
Clock 5: load A(1) into P#1
DO i=1, 50
Clock 6: load C(i) into P#1
Clock 7: multiply A(i)*B, store in P#1 register, load A(i+50) into P#2
Clock 8; subtract C(i)−D, store in P#1 register, load C(i+50) into P#2
Clock 9: add register A(i)*B to register C(i)−D, P#1 multiply A(i+50)*B, store in P#2
Clock 10: store X(i) P#1 in memory 14 subtract C(i+50)−D, store in P#2
Clock 11: load A(i+1) into P#1 add A(i+50)*B to C(i+50)−D, P#2
Clock 12: store X(i+50) P#2 in memory 14
ENDDO Timing the processor P#1 bus cycles to occur while processor P#2 is performing processor cycles allows both processors to operate at approximately 86% efficiency, reducing the time to complete equation 2 to 5+(50*7)=355 clocks. Therefore, processing capacity has been increased without adding processors to the system. The bus is used during six of the seven nested clock cycles. Therefore, increasing the number of bus cycles by including additional processors has a minimal effect on the overall processing time.

Maximized bus efficiency is also needed for data processing elements that perform more than one arithmetic operation per clock cycle. Many data processors allow parallel addition and multiplication operations during the same clock cycle, further reducing the proportion of time spent in calculations and increasing the proportion of time spent transferring data. With a processing element that conducts two arithmetic operations concurrently, equation 2 performance time reduces by one processor clock cycle, generating the result of X(i) in two clocks:

Clock 1: A(i)*B=E
C(i)−D=F

Clock 2: X(i)=E+F. This increases the likelihood that the time required to transfer data between the processor and memory will be the limiting factor in system processing capacity. It is therefore seen that processing capacity is often limited by bus bandwidth and that by maximizing bandwidth use, system performance may be improved.

FIG. 2A illustrates the time line for a dual processing element system in accordance with the prior art where there is no memory access sequencing. While processor P#1 uses the bus, processor P#2 is idle, and once P#1 has completed its bus cycles, P#1 becomes idle and P#2 uses the bus. After P#2 is finished with the bus, then both processors P#1 and P#2 enter processing cycles, performing their calculations concurrently. Once the processing cycles are complete, processor P#1 enters a bus cycle state while processor P#2 remains idle, and when P#1 finishes its bus cycles P#2 enters the bus cycle state.

FIG. 2B illustrates the time line for a dual processing system performing the algorithm in equation 2 using processor sequencing. It is shown in FIG. 2B that to use the total bandwidth of the data bus efficiently (utilizing the data bus for each bus cycle), bus access for processor P#1 is sequenced to occur during times processor P#2 is processing data within internal processor memory. The number of processors that can be effectively attached to the bus without being limited by bus bandwidth is restricted according to the ratio of the time each processor needs to process data versus the time needed for each processor to transfer the data. This ratio is algorithm dependent and is referred to as algorithm locality or compute intensity. An algorithm with high locality performs a large number of processor operations for a small amount of transferred data.

FIG. 2C illustrates the time line for a multiprocessor element system where the number of processing cycles required to perform the algorithm (processing cycles) as compared with the number of cycles necessary to transfer the data to and from memory (bus cycle) is large. As soon as the combination of bus cycles for each processor equals the number of processing cycles required to calculate the algorithm, any additional processing elements added onto the data bus will not increase system efficiency.

Locality is also affected by the architecture of each processing element. In an embodiment of the present invention, internal memory in each processor provides temporary storage of intermediate data from operations, allowing a more complex algorithm to be performed on the same quantity of transferred data. For example, it is common in signal processing algorithms to carry out a forward fourier transform, process the transformed data, and then take the inverse fourier transform of the processed data. With a large internal processor memory, all three steps can be performed on a larger array of data without having to access external memory. Increasing the algorithm complexity maximizes the locality of the data transferred over the bus, increasing the number of processors that can efficiently process data at the same time.

The system according to the present invention takes into account algorithm locality for maximizing the efficiency of computer systems. By sequencing processing elements, the data bus bandwidth use is maximized. This principle is then applied to a multiple bus computer architecture (each bus and its associated processing elements comprising a processing node) with multiple memory ports (suitably one port per node) so that maximum processing capacity for each processing node is achieved for each memory port in a system whereby processing productivity is maximized while minimizing the hardware and software complexity.

Figure 3:
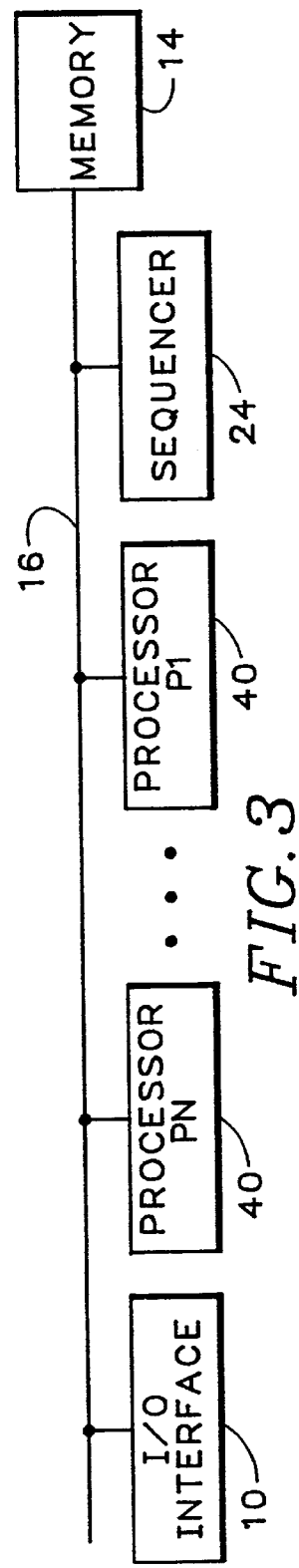
FIG. 3 is a block diagram of a single bus multiple processor element architecture having hardware synchronization.

FIG. 3 illustrates an aspect of the present invention in a multiple processor, single bi-directional bus system. Multiple processing elements 40, I/O interface 10 and memory 14 are connected to bus 16. Sequencer 24 includes an array of CPU (i.e. processor) registers that are manipulated by the processing elements on the bus based on whether they are requesting, using or releasing data bus 16. Each processor reads the CPU registers in sequencer 24 prior to accessing memory 14 to determine if the processor is allowed access. When access to the bus is given, the processor transfers data to memory 14 and then disables a register bit in a register of sequencer 24. Sequencer 24 then enables the processor with the next highest priority.

Figure 4:
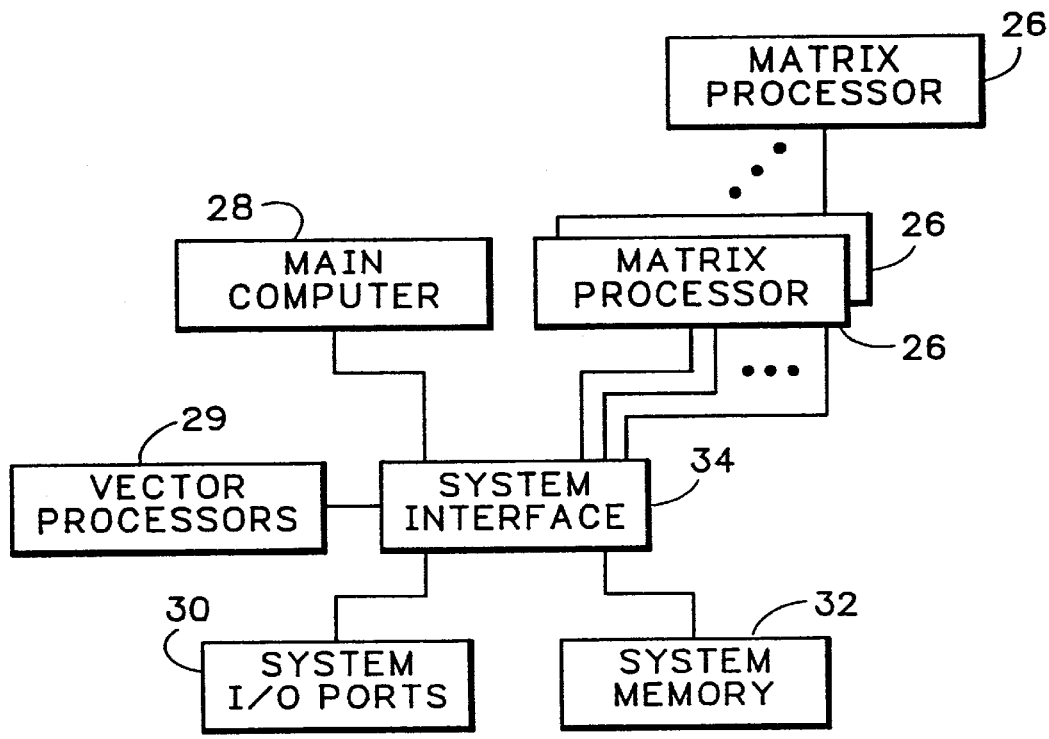
FIG. 4 is a block diagram of a computing system employing the matrix processor of the present invention.

Referring now to FIG. 4, comprising a generalized block diagram of a computing system employing matrix processors in accordance with the present invention, multiple matrix processors 26, main computer 28, vector processors 29, system I/O ports 30 and system memory 32 all connect to a system interface 34. The main computer and vector processors together may comprise, for example, a System 500 Supercomputer manufactured by FPS Computing, Beaverton, Oreg. In a preferred embodiment, the main computer is employed for handling time-sharing and other operations and the vector processors undertake moderately intensive numerical operations while highly computationally intensive processes are sent to the matrix processors 26. The system is configured in a co-processor architecture where data is accessible from either the host computer system or directly from an external data source. The number of matrix processors connected in the system is variable, wherein users with complex applications would employ a larger number of matrix processors.

Figure 5C:
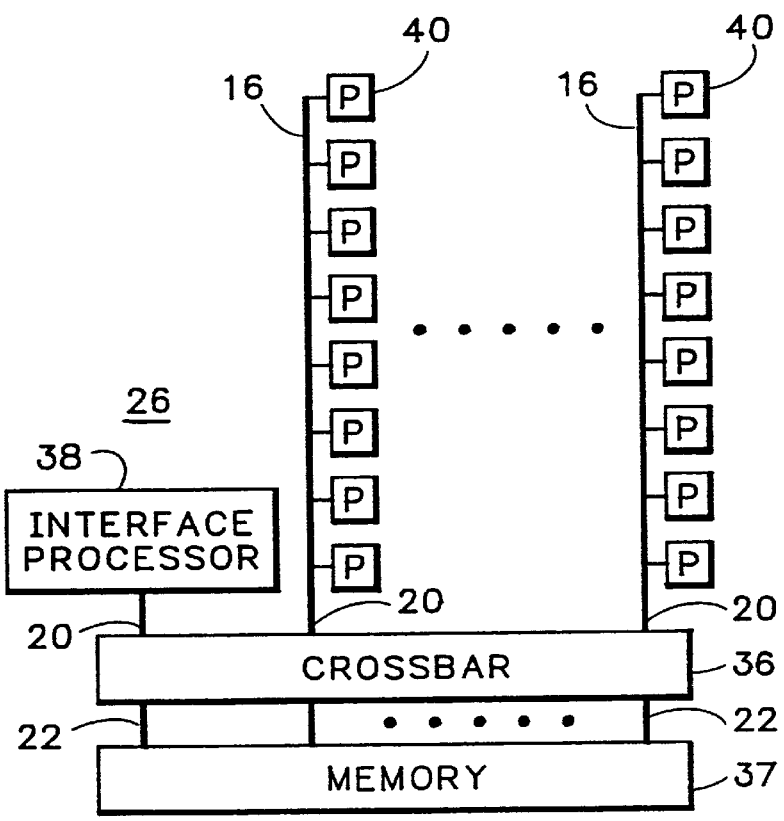
FIG. 5C is a block diagram of a matrix processor in accordance with the present invention employing eight processing elements per bus.
Figure 5A:
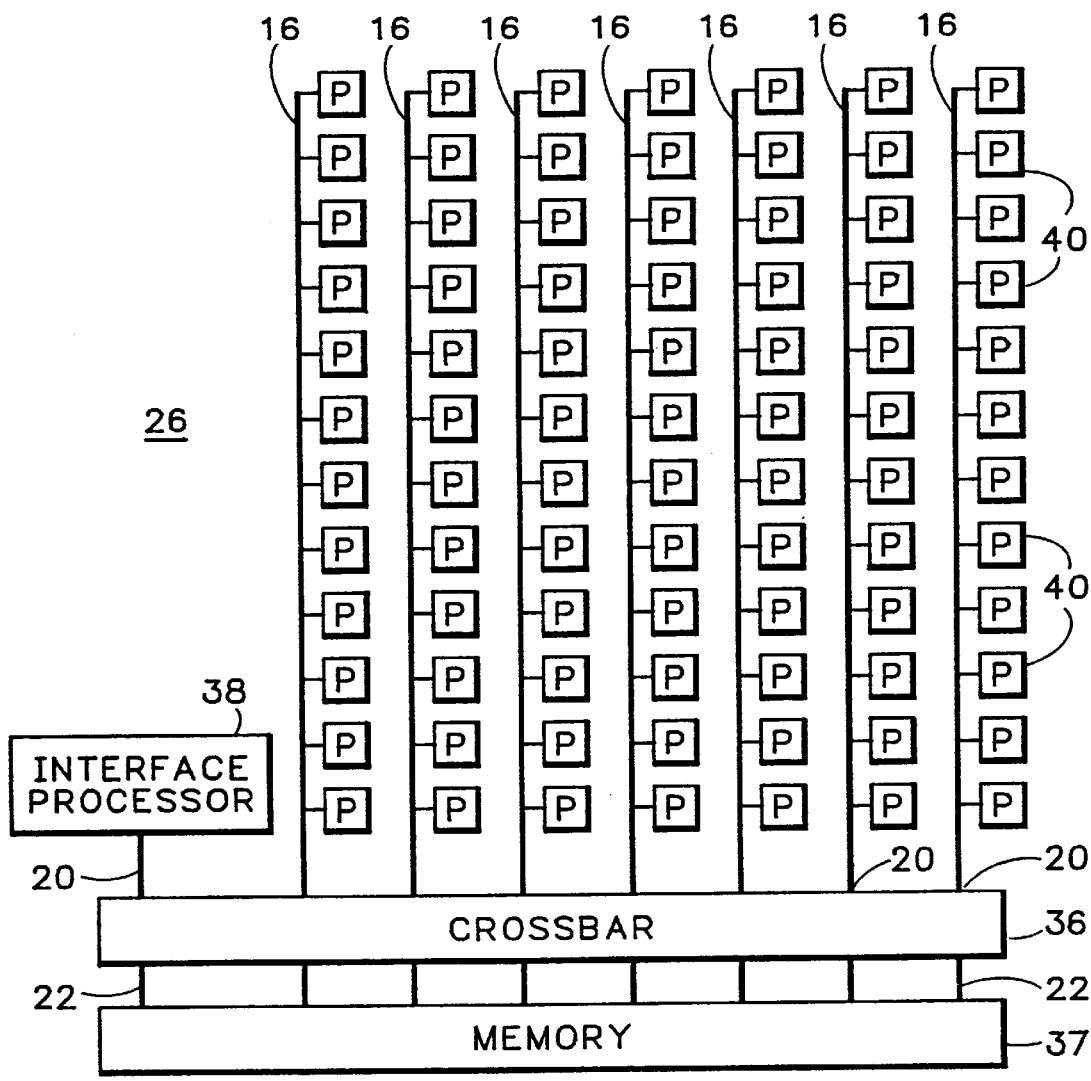
FIG. 5A is a block diagram of a matrix processor in accordance with the present invention.
Figure 5B:
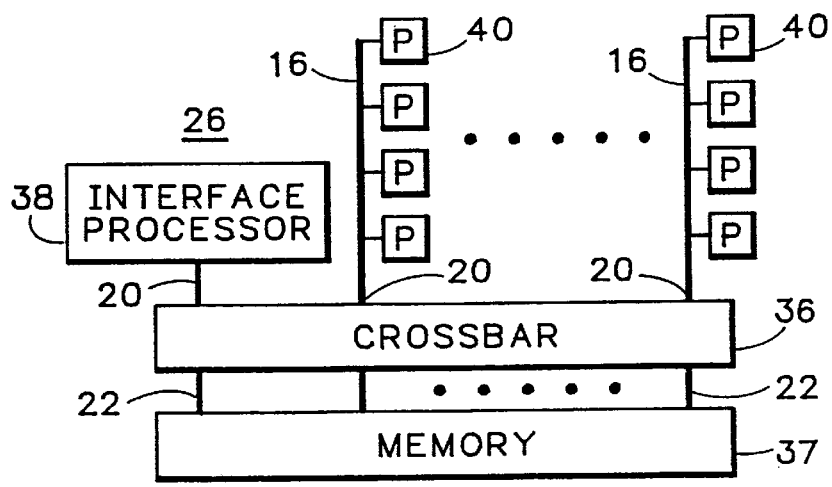
FIG. 5B is a block diagram of a matrix processor in accordance with the present invention employing four processing elements per bus.

FIGS. 5A–5C are block diagrams of various configurations of a matrix processor. Referring to FIG. 5A, a block diagram of a matrix processor 26 in accordance with the present invention, such processor is provided with multiple buses. (In the illustrated embodiment, seven buses are shown, but more or fewer buses may be employed.) Each bus connects to a crossbar/processor I/O port 20 of crossbar 36, and an equal number of crossbar/memory I/O ports 22 supply memory 37 from the crossbar. A system interface processor 38 connects to a crossbar/processor I/O port 20, and a corresponding crossbar/memory port 22 supplies memory 37. System interface controller 38 enables data transfer and control from either the main computer (to which it connects) or from an external data source. When interface controller 38 is connected to a host computer, the matrix processor according to the invention can serve as a coprocessor performing computationally intensive algorithms. The host computer is then free to execute simpler scalar operations and system support functions. Each bus 16 interconnects a number of processing elements 40. (In the illustrated embodiment, each bus interconnects twelve processing elements, but more or fewer may be used.) The number of processing elements and buses is suitably dependent upon the complexity of the computations to be performed, wherein more complex operations would suggest a greater number of processing elements per bus, and/or a greater number of buses.

FIGS. 5B and 5C illustrate alternative circuit configurations which may be utilized. FIG. 5B illustrates a system employing four processing elements 40 per bus and a variable number of buses 16, wherein modest locality algorithms would be performed. FIG. 5C is a block diagram of a matrix processor comprising eight processing elements 40 per bus. An embodiment in accordance with FIG. 5C might be employed for computations of medium locality, for example, fast fourier transforms and frequency domain filtering. On the other hand, a system employing twelve processing elements per bus (as in FIG. 5A) would suitably be adapted for high locality algorithms, for example, equation solving, matrix multiplies, convolutions and seismic migrations.

An alternative embodiment of the present invention may include each node having a memory block on the bus, with an interconnection between each bus (i.e. a crossbar or some other type of interconnection), rather than employing memory external to each bus with interconnection therebetween. For example, each node may be configured as a node of a hypercube. Each node may also carry an I/O interface for communicating with external devices.

Since processing capacity on any single node (where node is defined as a bus and its accompanying processors) is limited by the time spent accessing memory versus the time spent processing the data transferred into the processing elements, the optimal number of buses for performing an algorithm is dependent on the size of a data array and the bandwidth necessary to conduct the operation in an acceptable amount of time. Sequencing of elements on different nodes takes place to maximize the bandwidth for each memory port in the memory. By sequencing the CPUs on each node and sequencing memory accesses between nodes, the matrix processor has a greater processing capacity.

Figure 6A:
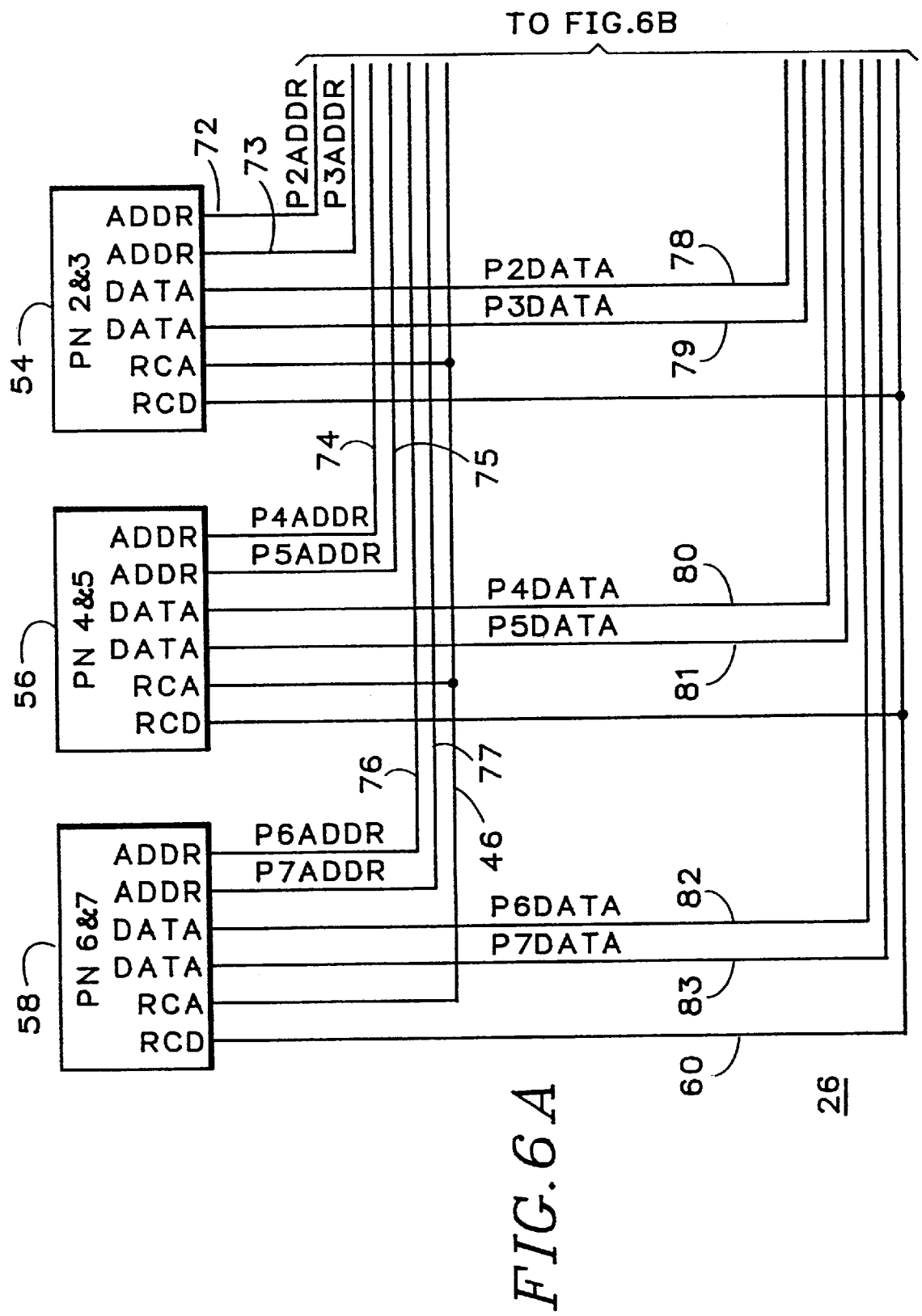
FIGS. 6A and 6B jointly comprise a more detailed block diagram of the matrix processor system of FIG. 5.
Figure 6B:
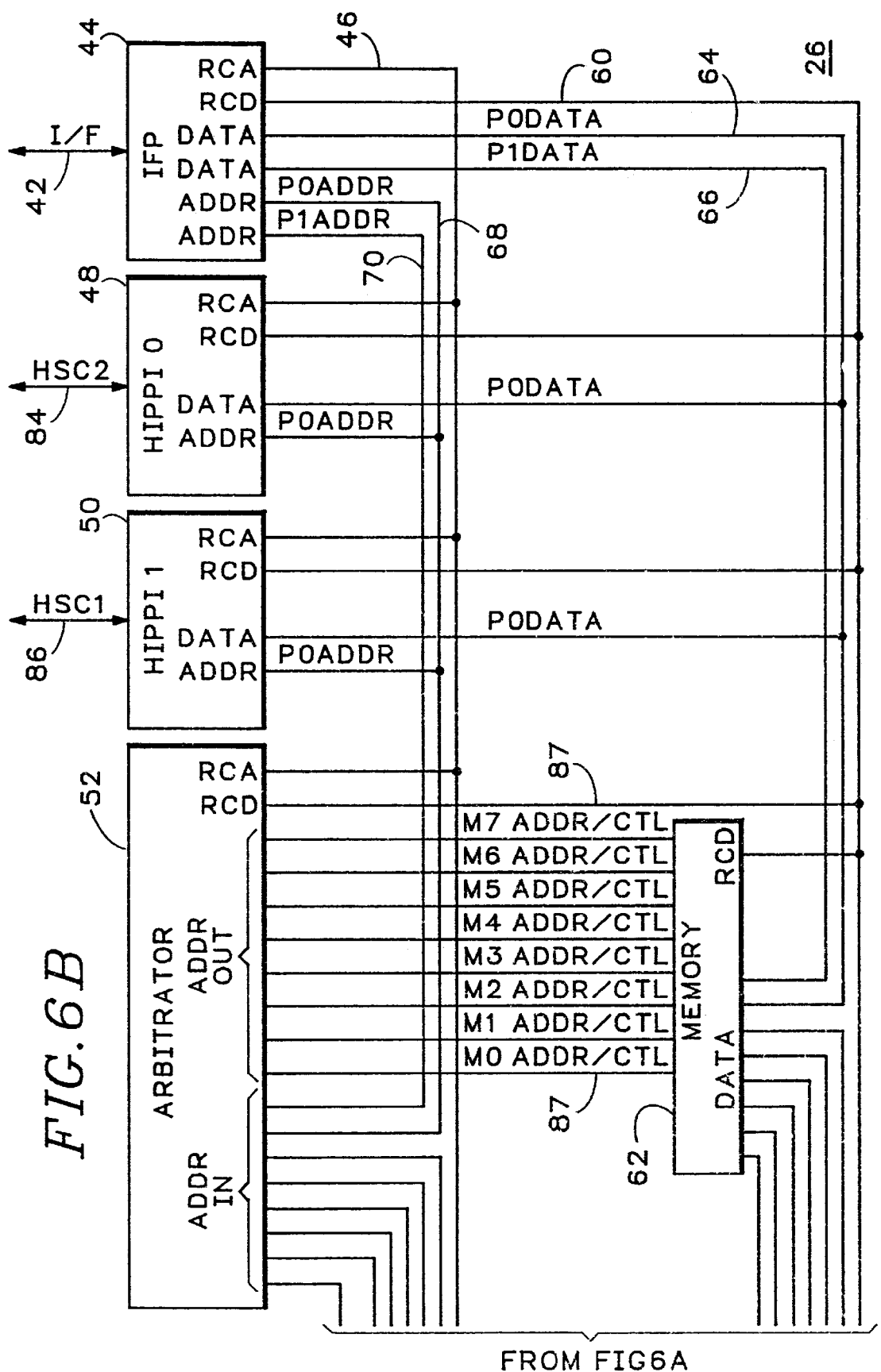

Referring now to FIGS. 6A and 6B, which together constitute an overall block diagram of a preferred embodiment of a matrix processor 26, interface bus 42 from main computer 28 is coupled to interface processor (IFP) 44. Register/control address lines 46 then connect between the interface processor and each of a first high performance parallel interface (HIPPI) block 48, a second high performance parallel interface (HIPPI) block 50, arbitrator block 52, processor nodes 2 & 3 shown as block 54, processor nodes 4 & 5 shown as block 56 and processor nodes 6 & 7 shown as block 58. Register/control data bus 60 supplies data to each of blocks 44, 48, 50, 52, 54, 56 and 58, as well as memory block 62 (which corresponds to memory 37 in FIG. 5). The various registers of the system are memory mapped to reside within the register control address space which suitably comprises the "lower half" of addressable memory of the matrix processor in the preferred embodiment. Processor node zero data bus 64 (P0DATA) interconnects a data port of memory 62 with a first data port of interface processor 44, and the data ports of HIPPI 48 and HIPPI 50. Processor node one data bus 66 (P1DATA) supplies data between memory 62 and a second data port of interface processor 44. Node zero address bus 68 (P0ADDR) connects a first address port of interface processor 44, address ports from HIPPI 48 and HIPPI 50 and an input address port of arbitrator 52. Node one address bus 70 (P1ADDR) provides address information between a second address port of interface processor 44 and another address port for arbitrator 52. Processor nodes 2 and 3 address buses 72 and 73 (P2ADDR, P3ADDR), processor nodes 4 and 5 address buses 74 and 75 (P4ADDR, P5ADDR) and processor nodes 6 and 7 address buses 76 and 77 (P6ADDR, P7ADDR) connect address ports for processor node blocks 54, 56 and 58 respectively to address input ports on arbitrator 52. Processor nodes 2 and 3 data buses 78 and 79 (P2DATA, P3DATA), processor nodes 4 and 5 data buses 80 and 81 (P4DATA, P5DATA) and processor nodes 6 and 7 data buses 82 and 83 (P6DATA, P7DATA) interconnect their respective processor node data ports with data ports of memory 62. Buses 84 (HSC2) and 86 (HSC1) provide a data path between HIPPIs 48 and 50 respectively and external devices (for example, the main computer, external memory, etc.). Arbitrator 52 drives address and control buses 87 (M0ADDR/CTL, M1ADDR/CTL . . . M7ADDR/CTL) coupled to address ports of memory 62. At least portions of blocks 44, 48 and 50 may be viewed as part of block 38 in FIG. 5.

Interface processor 44 is a slave to interface bus 42, serving as the control interface between the host processor (e.g. main computer 28 of FIG. 4) and the matrix processor. Data is transferred from the host computer over bus 42 through interface 44. Other data sources may transfer data over buses 84 and 86 through parallel interfaces 48 and 50.

In a preferred embodiment, processor node blocks 54, 56 and 58 each comprise one or more processing nodes, wherein such a processor node corresponds to a single data bus 16 as shown in FIG. 5A together with a plurality of processing elements 40 coupled thereto. Each of processor node blocks 54, 56 and 58 comprises up to two nodes in a preferred embodiment, while interface processor block 44 also includes one processor node (P1NODE). Therefore, in an embodiment of the present invention having only one data processing node, processor blocks 54, 56 and 58 would not be present, but additional processing capability would be available by adding subsequent processing blocks. A minimal system according to the present invention will include the single processing node (P1NODE) contained within IFP 44.

In operation, interface 44 enables control data to be written directly into internal registers for each processing node to perform resets, interrupts, and serial/burst data transfers. Interface 44 also serves as an arbitrator for use of the P0DATA bus 64 and P0ADDR bus 68 by interfaces 48, 50, and 44. Arbitration during burst transfers is handled on a round robin priority basis such that each requester, after releasing the port, moves to the lowest priority. If the requesting device is IFP 44, once granted buses 64 and 68, the IFP will continue to have control until it drops its request. If either HIPPI 48 or 50 is the requesting device, up to 128 words (in the preferred embodiment) may be transferred before another device is allowed access.

Buses 84 and 86 may transfer data to and from memory 62 through the interfaces 48 and 50. When data is transferred into the matrix processor either interface 48 or 50 provides the address over P0ADDR bus 68 through arbitrator 52 to memory 62. Data is transferred from memory 62 over P0DATA bus 64 through the requesting parallel interface processor and transmitted over data bus 86 or 84 respectively to an external device. When data is transferred between the processing nodes and memory 62 the data is sent directly to memory 62 while the address is first processed by arbitrator 52 before being sent to the memory.

Crossbar 36 of FIG. 5 is split into an address portion and a data portion, with the address portion contained within arbitrator 52 and the data portion residing within memory 62. They are hereinafter more fully described.

Figure 7:
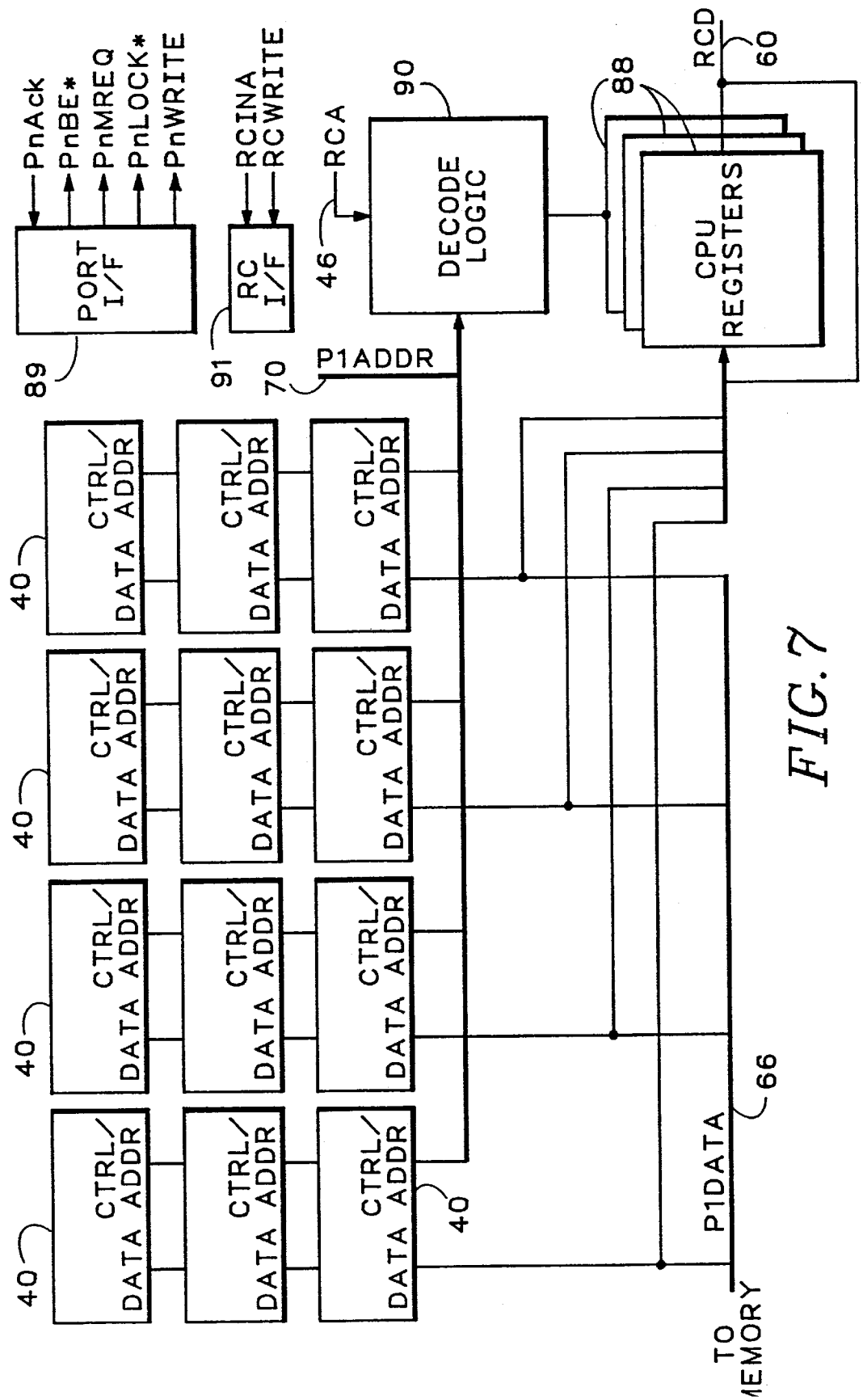
FIG. 7 is a detailed block diagram of a single processing node of the FIG. 6A and 6B system.

FIG. 7 is a detailed block diagram for a single processing node (P1NODE) as contained within IFP 44; however, nodes within processing blocks 54, 56 or 58 would be substantially the same. A node bus, as hereinbefore designated by the reference number 16, is realized in particular by the combination of data bus 66 and address bus 70 in FIG. 7. Data bus 66 (P1DATA) is coupled to data lines of plurality of processing elements 40. The processing element data lines are connected as well to CPU register array 88 for performing the function of sequencer 24 in FIG. 3. Data bus 66 also connects to memory 62 as discussed hereinabove in conjunction with FIGS. 6A and 6B. The address and control lines from each CPU are connected to address bus 70 (P1ADDR) which is coupled to arbitrator 52 (FIG. 6B). The address and control signals are decoded by logic circuit 90 while output of the logic circuit is provided to the CPU register array 88. Register control address bus 46 is also decoded by decode logic circuit 90, and register control data bus 60 is coupled to CPU register array 88 as well as to the processing element data lines.

The decode logic 90 receives address information from the CPUs on the node and from CPUs on other nodes via the RC address bus. For register accesses by CPUs local to the node, register addresses are recognized by the decode logic, and the logic prevents port interface 89 from generating external memory access requests (PnMREQ) to the arbitration block, thereby preventing initiation of a register control bus access of the registers. If an access is being made to the registers on the node by a CPU on another node via the RC address and data bus, the decode logic gives priority to the register control bus access over local CPU accesses to the register array. The decode logic then enables the appropriate register for read or write access.

Port interface logic block 89 is responsible for generating read and write requests via the node connection to the crossbar, receiving a PnACK signal (from arbitration block 52) and generating PnBE*, PnMREQ, PnLOCK* and PnWRITE as output signals to the arbitration block. PnBE*, the processor node byte enable signal (PL1BE* for node one, P2BE* for node two, etc.), enables individual bytes within a memory word for write access, each bit within PnBE* corresponding to a byte within a memory word. (If not asserted, memory may be read but not written.) PnMREQ is a port memory request access signal which indicates the port's request for access to the memory bus or the register control bus. PnLOCK* is a locking signal asserted to the arbitration block for indivisible read-modify-write sequences of memory. When a processor node lowers the PnLOCK* signal it is given access to all memory ports and normal arbitration for all other nodes is disabled as described in conjunction with FIGS. 13A and 13B herein. The PnWRITE signal identifies write accesses (if PnWRITE is asserted) or read accesses (if PnWRITE is not asserted) of memory. Port interface logic block 89 contains logic for generating the request for memory reads and writes asserting the PnMREQ signal when a CPU on the node wishes to access memory via the crossbar. PnWRITE is asserted if the access is a write, or deasserted if the access is to be a read access. The interface asserts PnLOCK* if one of the CPUs on the node requests a lock condition. The interface logic will prevent the memory access from occurring until the PnAck signal is asserted to the node from the arbitration block. Register control interface logic block 91 receives RCINA (register control initiate for indicating initiation of register control access) and RCWRITE (register control write, for identifying write or read accesses, supplied via the register control address bus) signals (from arbitration block 52) and responds to read and write requests on the register control bus. When the RCINA signal is asserted, the RC interface logic instructs the decode logic block to enable the CPU registers for either a write (if RCWRITE is asserted) or a read (if RCWRITE is not asserted). The decode logic is responsible for selecting the appropriate CPU register based on the address value on the RC address bus 46. In the illustrated embodiment, twelve processing elements 40 are shown. However, as described in conjunction with FIG. 5, a greater or lesser number of CPUs may be employed.

Multiple CPU registers are provided in CPU register array 88, including the CPU barrier control and status register (suitably one per node, with one bit per CPU) which may be used to indicate and determine when a CPU is at a barrier state (hereinafter described), a hold mask enable control and status register which allows individual or multiple CPUs on a node to be placed in a "HOLD" condition (i.e. suspended from using the node bus) when both a hold mask enable bit and a CPU barrier bit for the corresponding CPU are set, and a configuration mask control and status register which allows software to configure CPUs into or out of the node. Each CPU is represented by a bit in the configuration mask control and status register whereby the currently available CPUs in the configuration register can define the "next" CPU. The node arbitration control and status register contains the value associated with the CPU on the node having highest round robin priority within a node. A software interrupt control and status register (also included in array 88) allows individual or multiple CPUs to be interrupted by a write to the register (or returns status when read). The CPU registers may be accessed locally by the processing elements on the node without any access to the memory system.

In a preferred embodiment of the invention, one node barrier control and status register is provided per matrix processor (suitably located within the interface processor block 44), although more than one may be employed, to allow setting and reading of node barrier states (as defined hereinbelow). The node barrier, CPU barrier, hold mask enable, and software interrupt registers may be write accessed in a number of ways. The registers may be written bit for bit. The write value may be treated as a "set" mask, wherein each set bit in the write value is used as a mask for setting bits in the register, or the write value may be treated as a "clear" mask, wherein the set bits in the write value are cleared in the register. The write value may also be treated as a "set/clear special write" wherein only the requesting CPU's bit may be set (or cleared) or the "next" CPU's register bit may be set or cleared. The registers are mapped to multiple addresses and the type of write access is determined by the address used for access.

The ability to affect the "next" CPU's bit is used in passing control to another CPU. The current CPU may, when finished with an operation, set or clear its own bit while clearing a bit in the "next" CPU, thereby passing control to the next CPU. The "next" CPU is the next CPU with a bit enabled in the configuration register, e.g. if CPU 1 is currently active, and the next CPU with a configuration bit set is CPU 5, then CPU 5 is the "next" CPU.

The hold mask enable register, configuration mask register and CPU barrier register provide support for algorithm sections that are performed in parallel and enable sequencing to ensure all processors have completed multiprocessing sections before further processing is started. The additional registers provide the ability to test status, node arbitration reset and software interrupts. Use of the hold mask enable, configuration mask, CPU barrier and node barrier registers synchronizes CPUs for allowing full utilization of the node bus data bandwidth while still allowing CPUs to arbitrate for access to the bus in a round robin fashion as discussed herein in conjunction with FIGS. 14A–14D.

Register bits are set by the various processing elements 40, or externally by a system host computer. The processing elements modify the register bits by sending a memory mapped address to decode logic 90 which identifies the processing element and function, and enables the appropriate register and corresponding register bits. The transmitting processing element then sends a data value over processor data lines which controls the type of modification performed on the enabled register bits.

As an example, the memory map for the local CPU barrier register may comprise five addressable functions:

| Address  | Register Name | Write Type          | Read Type |
|----------|---------------|---------------------|-----------|
| 7FFF0040 | CPU Barrier   | bit for bit reg write | Std     |
| 7FFF0048 | CPU Barrier   | Set mask            | Std       |
| 7FFF0050 | CPU Barrier   | Clear mask          | Std       |
| 7FFF0058 | CPU Barrier   | Set/Clr Special     | Std       |

A "bit for bit reg (register) write" allows the value placed on the processor data line (connected to bus 66) to be written into the register in array 88. The "Set mask" write type of access sets the register bits corresponding to the bits set in the written value, while "Clear mask" clears the bit for each processing element with the corresponding bit set in the written value, leaving other bits unchanged. "Set/Clr Special" is used to set and clear individual processing element bits without disrupting the state of the CPU bits for other processing elements on the node. The following is a summary of the individual bit manipulations that can be performed during a "Set/Clr Special".

If data bit 0 (least significant data bit) is "one", then the requesting CPU's bit is cleared and if data bit 1 (second least significant data bit) is "one", then the requesting CPU's bit is set to one. If both data bits 0 and 1 are "one", then the requesting CPU's bit is set to one. Setting data bit 2 to "one" clears the next CPU's bit and when data bit 3 is "one", then the next CPU's bit is set to one. If both data bit 2 and data bit 3 are "one", then the next CPU's bit is set to "one". The next CPU is determined by the configuration register which has a bit set for each CPU coupled to the node. For example, to set the barrier bit for one CPU 40 without disturbing the bits in the rest of the CPU barrier register, the particular CPU places the address 7FFF0058 on address bus 70. Decode logic 90 determines a Set/Clr Special is going to be performed. The CPU 40 sends a "one" on data bit 1 indicating to CPU Register 88 that the requesting CPU's CPU barrier bit should be set.

If data bits 2 and 3 are both "one", then the next CPU's CPU barrier bit is set. Reading the registers at any of the mapped addresses will return the value stored within the register. While the illustrated example concerns the CPU barrier register, other registers may be accessed in a similar manner (via other memory mapped addresses).

Figure 8:
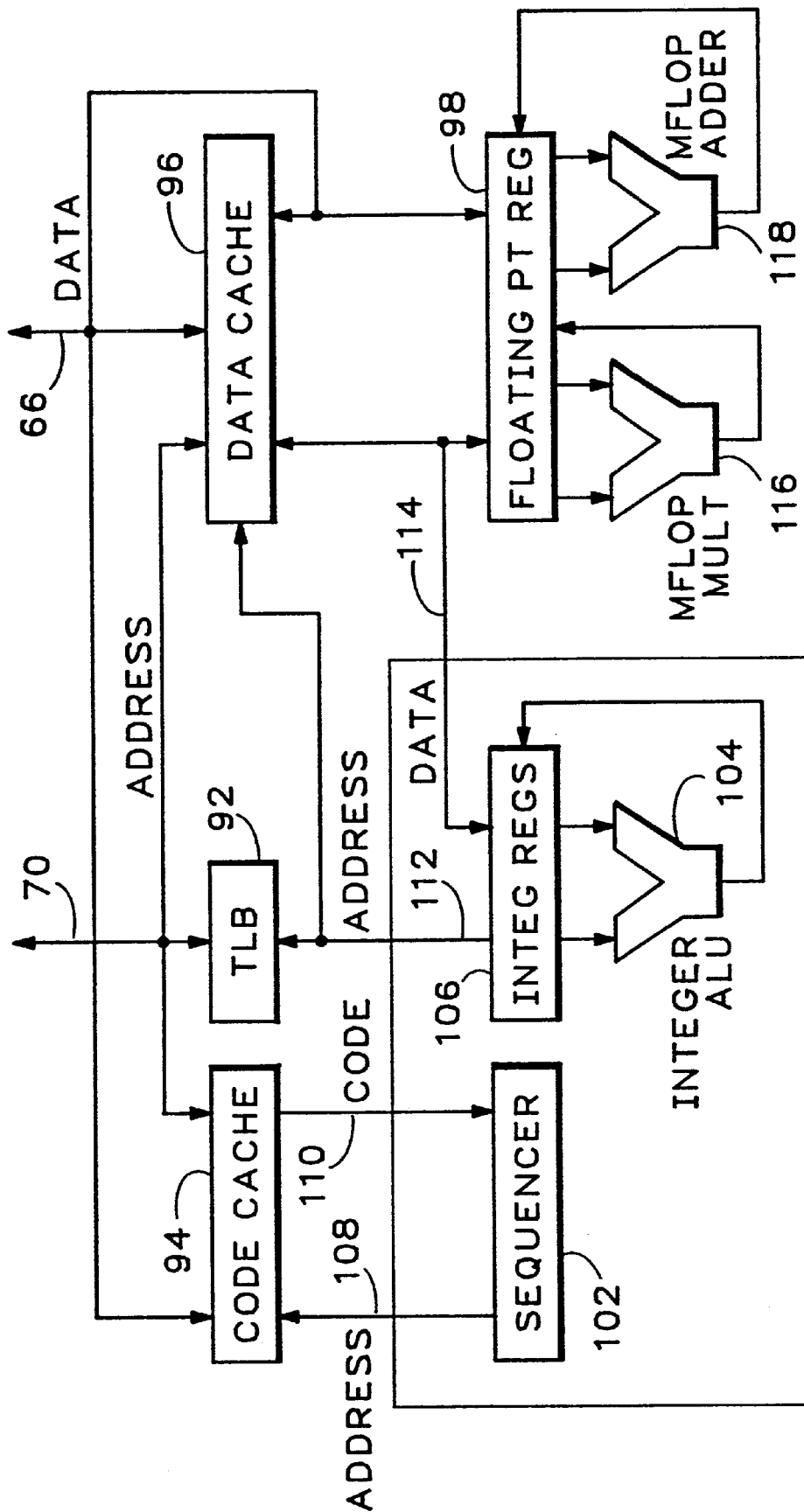
FIG. 8 is a block diagram of an individual processing element according to the present invention.

FIG. 8 is a detailed block diagram of an individual CPU 40 in FIG. 7. In a preferred embodiment, Intel i860 64-bit microprocessors are employed as the processing elements (CPUs) 40. However, different microprocessor architectures could be used depending on system performance requirements. CPU 40 receives data bus 66 and address/control bus 70 which are coupled to translation lookaside buffer 92, code cache 94 and data cache 96. Data bus 66 also supplies floating point register array 98. Core execution unit 100, comprising instruction sequencer 102, integer ALU 104 and integer register array 106, controls overall operation of the processing element. The address bus 108 and code bus 110 of sequencer 102 are coupled to code cache 94 while the address bus 112 of integer register array 106 is fed to translation lookaside buffer 92 as well as data cache 96. Data cache 96 supplies data to register array 106 and floating point register array 98 via data bus 114. The input and output of integer ALU 104 are coupled to register array 106, while the input and output of a floating point multiplier 116 and a floating point adder 118 are connected to floating point register array 98. Translation lookaside buffer 92 transmits data to data cache 96 or data bus 66, and instructions to code cache 94 or address bus 70. Code cache 94 transfers instructions to sequencer 102 after the sequencer 102 transmits the appropriate address, sequencer 102 controlling integer branches and control instructions for the processing element. Data cache 96 distributes data between floating point registers 98 and integer registers 106 while floating point register array 98 supplies 64 bit operands each cycle to floating point adder 118 and floating point multiplier 116 and alternatively supplies operands to core unit 100. Integer ALU 104 is coupled to integer register array 106 and performs 32 bit integer and logical operations for core execution unit 100. Integer register array 106 supplies address values to translation lookaside buffer 92 and data cache 96.

Initial instructions for each data processing unit are transferred from memory block 62 (FIG. 6B) into code cache 94. After the algorithm is loaded into code cache 94, a block of data array stored in memory 62 is also transferred into data cache 96. The CPU then releases data bus 66 and address/control bus 70 by setting and clearing the appropriate CPU registers 88 (FIG. 7) and the CPU begins to perform the algorithm loaded into the code cache with the data block loaded into the data cache. During the internal processing of the data block, other CPUs are free to use buses 66 and 70. The matrix processor utilizes the address and data caches of the CPU to reduce the time a given CPU needs to use the system buses.

In application of the CPU, core execution unit 100 transmits a virtual address to translation lookaside buffer (TLB) 92 and data cache 96. If core unit 100 determines one of the caches does not contain the desired virtual address, TLB 92 generates a physical address that is then transmitted to memory 62 (via address bus 70). However, if the virtual address supplied by execution unit 100 exists in either code cache 94 or data cache 96 then the physical address is not sent over bus 70. Instead, the code or data value associated with the virtual address is transferred from the appropriate cache memory to the appropriate sequencer, integer, or floating point register location.

The matrix processor also utilizes parallel processing capacity of each CPU to increase total processing capacity. Code cache 94 provides two instructions each clock cycle allowing core instruction unit 100 to receive two instructions per clock or to perform one core instruction and one floating point instruction each clock. The instruction cache and data cache can operate in parallel allowing the CPU simultaneously to read instructions from the instruction cache and data cache. Floating point registers (FPR) 98 enable floating point multiplier 116 and floating point adder 118 to operate in parallel and also concurrently with core execution unit 100, allowing an integer operation, a floating point add, and a floating point multiply to be performed each clock cycle.

For example, if the code for the algorithm in equation 2 is loaded into code cache 94, parallel floating point operations are performed. First, the floating point values B and D are loaded from data cache 96 into floating point register 98. Core unit 100 next sends the address for the first element of each array A(1) and C(1) to data cache 96. Data cache 96 transmits A(1) and C(1) to floating point register 98. Floating point multiplier 116 then performs the multiply A(1)*B, and floating point adder 118 performs the add C(1)–D during the same clock cycle. The two intermediate results are sent back to floating point register 98; floating point adder 118 adds the intermediate results together and generates the final result $X(1)=\{A(1)*B\}+\{C(1)-D\}$ feeding the result back to floating point register 98. The next elements in the arrays A(2) and C(2) are sent from data cache 96 to floating point register 98 while the prior floating point arithmetic operation is being performed. The value for X(1) is loaded back into data cache 96 as the next value X(2) is calculated. The algorithm continues until all values for X(i) have been calculated. The core execution unit then directs the data cache to write the values for X(i) into memory 62 and loads the next block of data for A(i) and C(i) into data cache 96.

Figure 9:
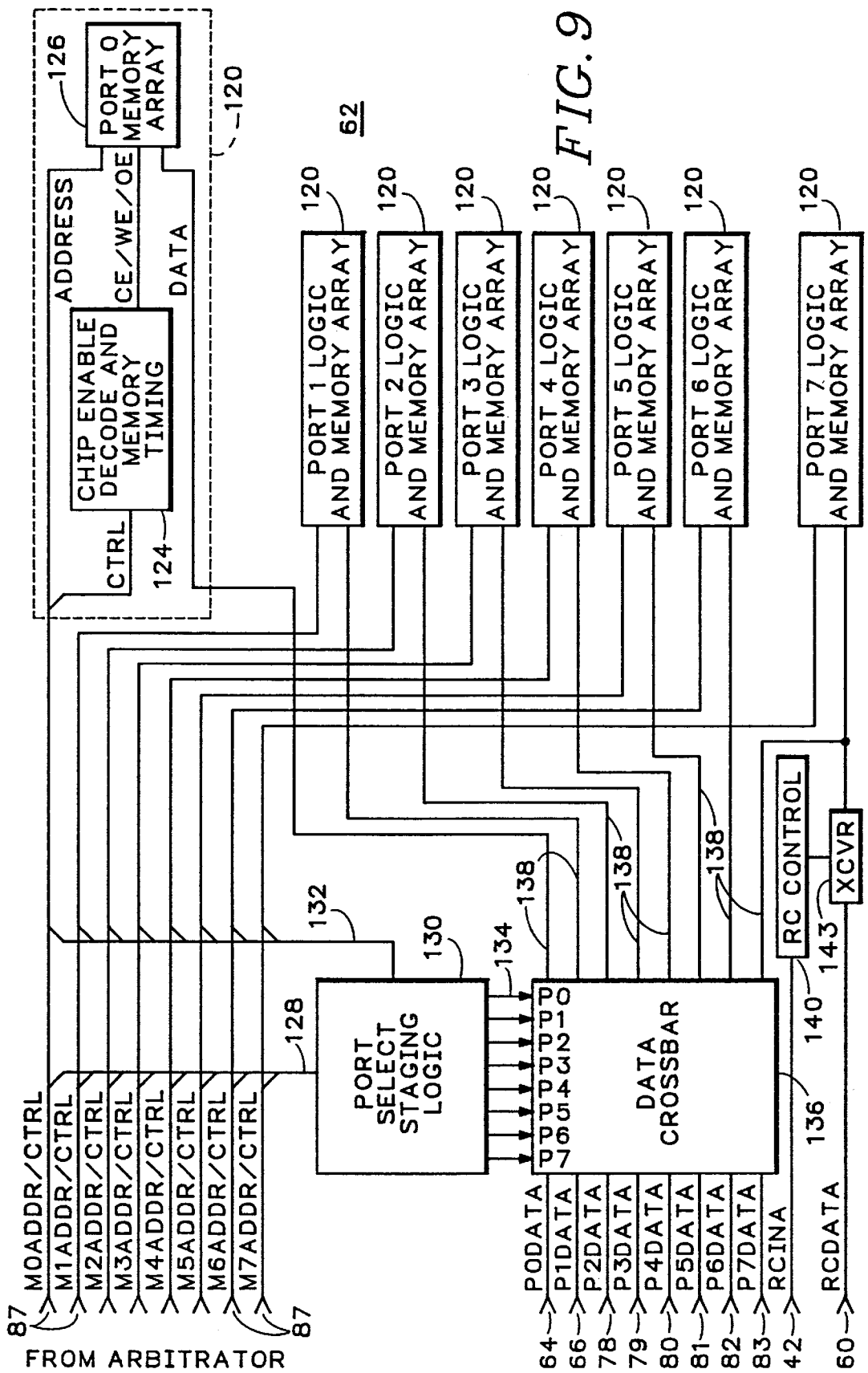
FIG. 9 is a detailed block diagram of the memory block of FIG. 6B.

FIG. 9 is a detailed block diagram of memory 62 from FIG. 6B. The memory suitably comprises a number of port logic and memory arrays 120 (eight in the illustrated embodiment). Separate address and control lines 87 (M0ADDR/CTRL, M1ADDR/CTRL . . . M7ADDR/CTRL) from bus arbitration block 52 (FIG. 6B) feed the memory arrays 120. Each port logic and memory array includes a chip enable decode and memory timing logic 124 receiving a control line from corresponding address/control bus 122 as input. The output of decode logic 124 is coupled to port memory array 126 via the CE/WE/OE line while the address portion of the address/control lines supplies the memory array directly. Port select control signals 128 (PORT0SEL, PORT1SEL . . . PORT7SEL) are a subset of memory address and control bus 87 and feed port select staging logic 130 while the output thereof comprises memory read/write control lines 132 supplied with address and control bus 87 to the various memory port logic and memory arrays. The port select control signals at 128 also include memory read enable signals (for indicating a memory read or write). Separate address and control lines are supplied to each memory port 120, including memory array 126 and associated decode logic 124.

Crossbar control lines 134 couple outputs of the port select staging logic 130 in separate data buses for each processing node, and data buses P0DATA, P1DATA, P2DATA, P3DATA, P4DATA, P5DATA, P6DATA, P7DATA (64, 66, 78, 79, 80, 81, 82 and 83) from each processing node and interface processor (FIGS. 6A and 6B) are input to data crossbar 136. Data crossbar 136 directs each data bus to the appropriate memory port 120 via the data lines 138.

The number and size of memory ports may vary depending on design requirements such that address, data, control, decode and crossbar sizes vary accordingly. The components in FIG. 9 can process all data and address inputs or the system can operate as a bit slice where FIG. 9 controls a portion of each address and data bus. Memory array 126 is not limited to any specific memory technology and can be constructed from, for example, static or dynamic components. In the preferred embodiment, static memory components were employed to allow access without wait states. Memory ports may be configured in varying ways to efficiently accommodate memory access requirements. For example, in the preferred embodiment, the ports in FIG. 9 can be configured different ways, depending on the addressing scheme. A double-word interleaved memory system is utilized where memory ports 120 contain a single 64 bit word (double-word). Port 0 contains the first word, memory port 1 contains the next sequential 64-bit word, memory port 2 contains the third 64-bit word and so on. Memory ports are also addressed on modulo 16 byte address boundaries or on a quadword interleaved system where the first address space in port 0 contains two sequential 64-bit data words, port 1 contains the next two words, port 2 contains the third set of 64-bit words and so on. The port configuration is determined by arbitration block 52 and is transparent to memory 62.

From port select lines 128 (generated by arbitration block 52), port select staging logic 130 determines when appropriate signals on crossbar control lines 134 should be asserted to data crossbar 136. There is one set of port select lines for each available memory port. Each crossbar control line selects one of the data buses (P0DATA, P1DATA, P2DATA, P3DATA, etc.) to connect to one of memory ports 120. Memory read/write signals 132 direct chip enable decode logic 124 to either send data or receive data to or from data buses P0DATA, P1DATA, P2DATA, P3DATA, etc. and memory arrays 126. Register control (RC) data bus 60 is connected to memory port 7 through transceiver 143 wherein RC control block 140 receives RCINA signal 142 (for indicating initiation of a register/control bus cycle) and an output signal from the RC control block governs the operation of the transceiver 143 for driving information onto or receiving information from the RC data bus.

For a memory write, port select lines 128 become valid on port select staging logic 130 and the port select staging logic 130 routes port select information to data crossbar 136. The port select staging logic also enables the appropriate port write signal on memory read/write control lines 132.

The node data bus (PnDATA) selected by crossbar 136 is coupled to the corresponding memory port, being enabled by chip decode logic 124 for the appropriate memory port, allowing the information on the node data bus to be written to the memory array. For a memory read, the value on the address/control bus 87 enables a specific memory location in one of the memory ports. The port select staging logic detects a read and captures the port select information associated with a memory read and, depending on the word size, directs data crossbar 136 to connect the memory port enabled by the address/control bus to the data bus P0DATA, P1DATA, P2DATA . . . P7DATA associated with the address/control bus.

Figure 10:
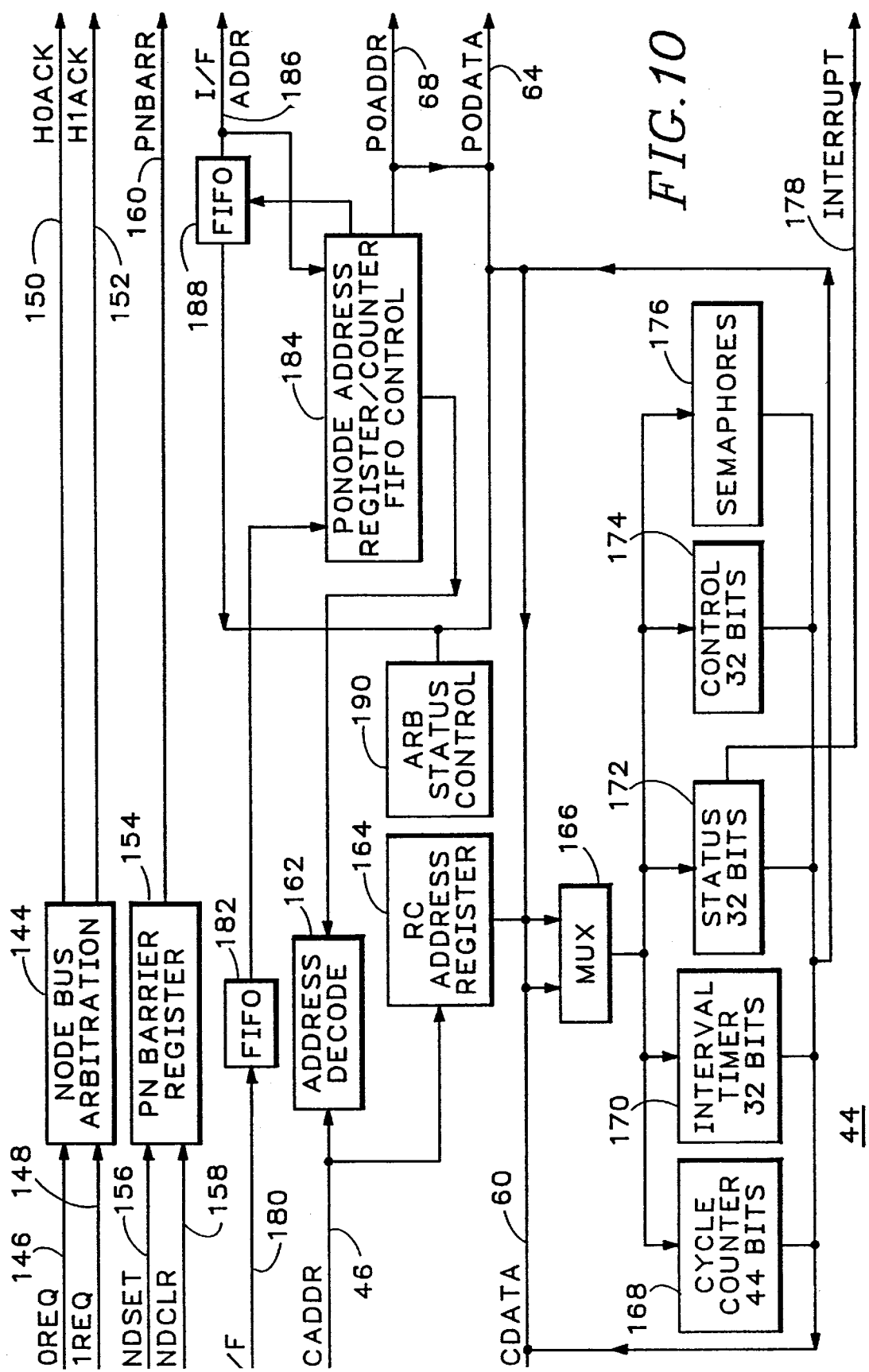
FIG. 10 is a more detailed block diagram of the interface processor of FIG. 6B.

FIG. 10 is a detailed block diagram of interface processor 44 (FIG. 6B). Interface processor 44 allows the matrix processor to communicate with a support processor, for example, the FPS Model 500 Supercomputer. The interface processor can operate as a slave on interface bus 42 and provides the matrix processor with a cable based interface to external processors. The node bus arbitration block 144 receives requests 146 (H0REQ) and 148 (H1REQ) from high performance parallel interface (HIPPI) blocks 96 and 98 (FIG. 6) and generates acknowledge signals on line 150 (H0ACK) and line 152 (H1ACK) for controlling access to node 0. The interface processor block 44 shares a processor port (node 0 in the preferred embodiment comprising P0DATA and P0ADDR) with the two HIPPI interfaces. The interface processor block has the responsibility of arbitrating between the different users of node 0, accomplishing such arbitration via node bus arbitration block 144.

Interface processor block 44 also comprises processor node barrier register 154 which receives processor node set line 156 and processor node clear line 158 (PNDSET and PNDCLR) from each processor node, allowing the various processor nodes to set and clear their barrier bits, indicating which processor nodes are at a barrier at any one time. The PNDSET line is asserted by a CPU on a processor node which wishes to set a bit in the node barrier register, while the PNDCLR line is asserted by a CPU wishing to clear a bit in the node barrier register. Whether a set or clear operation occurs is dependent upon the address used to access the node barrier register and the data value written at that address as discussed hereinabove. The processor node barrier register generates processor node barrier output signals at 160 used for reporting the barrier state of each processor node, e.g. in response to a read of the register. The processor node barrier register stores eight bits in the preferred embodiment (one bit per node). The use of the processor node barrier register is described in conjunction with FIGS. 14A–14D hereinbelow. The interface processor also receives RC address lines 46 and RC data lines 60. The RC address is supplied to address decode circuit 162 and to RC address register 164. The output of RC address register 164 as well as RC data base 60 supply two to one multiplexer 166. The output of multiplexer 166 supplies cycle counter 168, interval timer 170, status register 172, control register 174 as well as semaphore register 176. Cycle counter 168 counts clock cycles for the matrix processor and in a preferred embodiment counts 44 bits. Interval timer 170 is provided for generating timer interrupts; the timer decrements every clock cycle. Once the interval timer count reaches zero, a timer interrupt will be generated. In a preferred embodiment, the interval timer register stores a 32 bit value. The status register 172 contains interrupt request and parity error information and receives interrupt input signal at 178 from interface bus 42 (FIG. 6B). The status register information includes service requests from various processor nodes, the I/O processor and the HIPPI blocks. Control register 174 allows enabling and disabling of all interrupts within the matrix processor except for a reset interrupt. Register 176 provides semaphores for use by the matrix processor, for example, to provide software locks to protect critical sections of code. Registers 168, 170, 172, 174 and 176 provide output to RC data line 60 as well as to node zero data line 64 (P0DATA). The outputs of the various aforementioned registers are also fed back to multiplexer 166 (via RC data line 60).

Interface control signals, for example, address strobe, data strobe, write, burst, etc. from interface bus 42 (FIG. 6B) are input on line 180 through FIFO 182 for controlling the ordering thereof and the output of FIFO 182 supplies node address register/counter FIFO control module 184. The output of module 184 is supplied to node zero address line 68 (comprising 32 bits in a preferred embodiment) and is also supplied to node zero data line 64. Node address register/counter FIFO control 184 receives input from interface address line 186 from I/F bus 42, also supplied to FIFO 188, and the output of FIFO 188 is fed to node data line 64 (P0DATA). If parity errors occur, the IFP block generates an interrupt to a host computer on interrupt line 178. Node address register counter FIFO control block 184 also supplies a control line to address decode block 162 for controlling operation thereof. Arbitration status control 190 within the IFP block receives node data line 64.

When data is transferred from a host computer into the matrix processor via the interface processor, data is initially loaded into FIFO 188 while the requested memory address where the data is to be loaded in the matrix processor is placed on bus 186. An enable signal is provided on control bus 180. The data to be transferred is then introduced on bus 186 after the address is removed. For single word transfers, the address is followed by a single data word while for a burst mode transfer (single address followed by multiple data words) a burst signal is asserted by the host processor over control bus 180. The burst mode transfer loads FIFO 188 until the burst signal is deasserted. Address register/counter 184 keeps track of the number of words transferred into the FIFO and provides the address that is supplied to the memory port on bus 68.

The interface processor shares node zero data bus 64 and node zero address bus 68 with parallel interface processors 48 and 50 (FIG. 6). If more than one processor is attempting to transmit data over bus 64 node bus arbitrator 144 examines request signals 146 and 148 and determines which processor has priority. The interface processor has absolute priority during non-burst transfers to ensure that any problems with the other interface processors do not prevent the host computer from accessing matrix processor memory. Arbitration is handled in a round robin priority manner such that once an interface processor releases the data bus, it moves to the lowest priority. After priority has been given to either of parallel interface processors 96 or 98, an acknowledge signal is transmitted (via H0ACK line 150 or H1ACK line 152) to the processor that has been given access to the bus. The requesting device once granted data bus 64 and address bus 68 retains the bus until dropping its request line. This allows the requesting device to make efficient use of the memory port bandwidth. When the interface processor 44 is given priority, data is loaded into FIFO 188 (to be sent on I/F line 186 or P0DATA line 64). Once the FIFO is filled, the bus request is deasserted allowing another interface processor to access the memory port.

It will be noted that the interface processor block 44 includes a processor node, explained in conjunction with FIG. 7.

Figure 11:
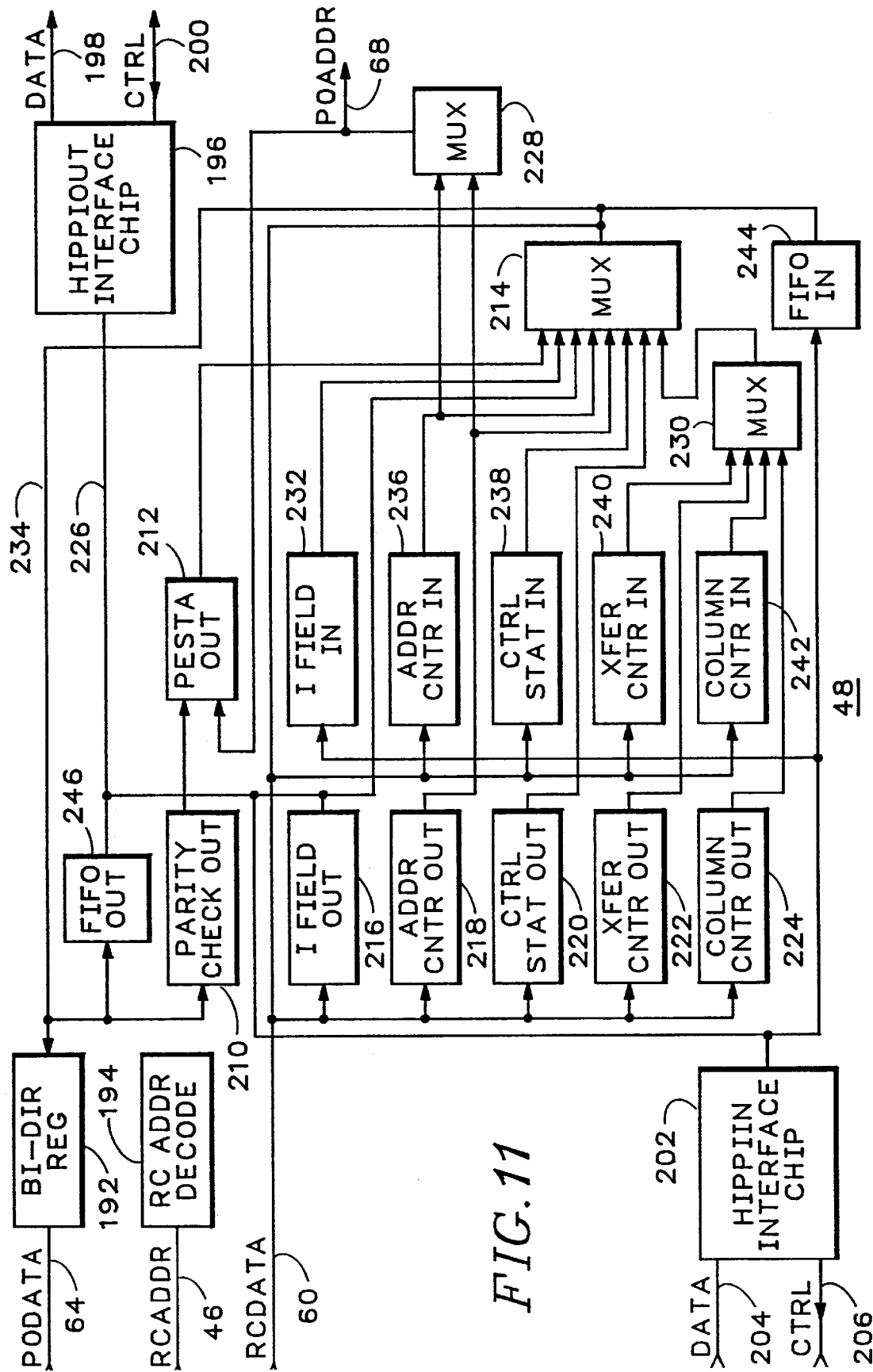
FIG. 11 is a detailed block diagram of the HIPPI block of FIG. 6B.

Referring now to FIG. 11, a block diagram of high performance parallel interface (HIPPI) block 48 (FIG. 6B), the operation thereof may be better understood. HIPPI blocks 48 and 50 operate in an identical manner, providing a connection between the matrix processor and external devices (such as the host computer or a peripheral such as a disc drive) supporting the HIPPI interface. In the preferred embodiment of the present invention, HIPPI block 48 receives data from the host computer, HIPPI block 50 connects with other external devices and the interface processor 44 receives control data from the host computer. The HIPPI is an industry standard interface (previously referred to as the HSC interface and the HPPI). HIPPI block 48 comprises a bi-directional register 192 which connects with node zero data line 64 (P0DATA) for sending and receiving data. The HIPPI receives RCDATA line 60 and register control address line 46 via RC address decode circuit 194. The HIPPI connects to memory 62 in the matrix processor via data bus 64, and to the control registers via buses 46 (RCADDR) and (RCDATA) 60 respectively. Each HIPPI block contains an input HIPPI as well as an output HIPPI. The output HIPPI interface 196 supplies output data lines 198 and output control lines 200. HIPPI input interface 202 receives input data lines 204 and input control lines 206. The HIPPI block further generates address information on P0ADDR bus 68. Lines 198, 200, 204 and 206 together comprise the interface lines 84, 86 of FIG. 6.

Referring again to bi-directional register 192, the data lines therefrom are supplied to parity check out 210 which checks for correct parity on the node data bus 64. The output of parity check 210 supplies parity error status register out 212 which provides information to determine specific memory parts generating parity errors. The parity error status register out 212 receives the address bus 68, with the output of parity error status register 212 being supplied to multiplexer 214 as an input. The input RC data lines 60 are supplied to I field out register 216, address counter out register 218, control status out register 220, transfer counter out register 222 and column counter out register 224. The I field out register 216 supplies information to a destination device via output data lines 226 coupled to HIPPI output interface chip 196. Address counter out register 218, which provides an address to the crossbar during a transfer by the HIPPI out interface, feeds multiplexer 214 and multiplexer 228. The output of multiplexer 228 is conveyed to node zero address line 68.

Control status output register 220 provides an output to multiplexer 214 and provides control to the HIPPI out interface as well as current status. The transfer counter output register 222 keeps a count of the number of bytes transferred, the output thereof supplying multiplexer 230 and the output of multiplexer 230 comprising an input of multiplexer 214. Column counter output register 224 decrements for each memory access and the output thereof is coupled to multiplexer 230.

The input interface of the HIPPI comprises I field input register 232 which receives input data from the HIPPI input interface chip 202. The output of the I field input register 232 is provided to multiplexer 214 and the output thereof supplies RC data line 60 together with internal data lines 234 (lines 234 comprising inputs to each of bi-directional register 192 and FIFO output port 246). I field input register 232 contains a value that is supplied on interface lines 84 or 86 (FIG. 6B) when an external device connect is requested. Supplying this value through multiplexer 214 to register control data lines 60 allows that value to be read on the register control data bus. RC data bus 60 also connects to address counter input register 236 which provides an address to the crossbar during a transfer by the HIPPI. The output of the address counter input register 236 is an input for multiplexer 214 as well as for multiplexer 228 to allow access on the register control bus and address line 68. Bus 60 feeds control status input register 238 and the output thereof is another input for multiplexer 214. The control status input register provides control for the HIPPI input and the current status thereof. Transfer counter input register 240 also receives bus 60 and serves to count the number of bytes transferred, with the output thereof supplied as input to multiplexer 230. The column counter input register 242 receives the register control bus 60 as input, with the register output comprising an input line of multiplexer 230. The column counter input register decrements with each memory access.

The input data from the HIPPI input interface chip 202 also supplies FIFO input 244 and the output thereof connects to data line 234, providing input to FIFO output 246 and bi-directional register 192. The output of FIFO 246 comprises input data for the HIPPI output interface chip 196 and for multiplexer 214 (on the same line as I field out register 216).

HIPPI input interface 202 controls the input HIPPI and provides appropriate control signals on the input cable 206, driving and receiving all the signals on the cable as well as data and parity lines 204. Error indications recognized by the input interface are sent to control status input register 238. The HIPPI out interface chip 196 is similar in that it is responsible for controlling the output HIPPI and providing appropriate control and data signals across control lines 200 and data lines 198. In the preferred embodiment, HIPPI output interface 196 and HIPPI in interface 202 comprise HIPPI interface chips manufactured by AMCC of San Diego, Calif.

The various registers and FIFOs of the interface are memory mapped within the register control address space to the matrix processor. To transfer data out of the matrix processor to an external device, the HIPPI first writes address and control information to I field output 216, transfer counter 222, and address counter 218. A request for processor bus 64 is sent via a write to control/status output register 220. When the request is received by and an acknowledgment is returned from node arbitrator 144 (FIG. 10), the HIPPI is free to load FIFO 246 from processor node data bus 64. Address counter output 218 is written with the starting address in the host processor where the data transfer is to begin and the address counter then supplies the address for each successive data word transferred over node address bus 68. During the transfer, address counter 218 increments for each byte of data transferred and when the count in transfer counter 222 goes to zero, an interrupt is generated. Column counter 224 decrements once for each memory access and is used in conjunction with transfer counter 222 to keep track of variable word size data transfers. The data stored in FIFO 246 is then sent through output interface chip 196 to the host computer on bus 198.

To transfer data from an external device to memory 62, the appropriate address and configuration bits are set in transfer counter 240, address counter input 236, and control/status input 238. The HIPPI requests the processor bus by sending a request to arbitrator 144 (FIG. 10). After a start transfer signal is received, address counter 236 supplies the address on address bus 68 and data from FIFO 244 is passed through register 192 onto processor data bus 64. Transfer counter input 240 indicates when all data from the FIFO has been transferred. The HIPPI then drops its request for processor bus 64 and, if necessary, begins to refill FIFO 244.

Figure 12A:
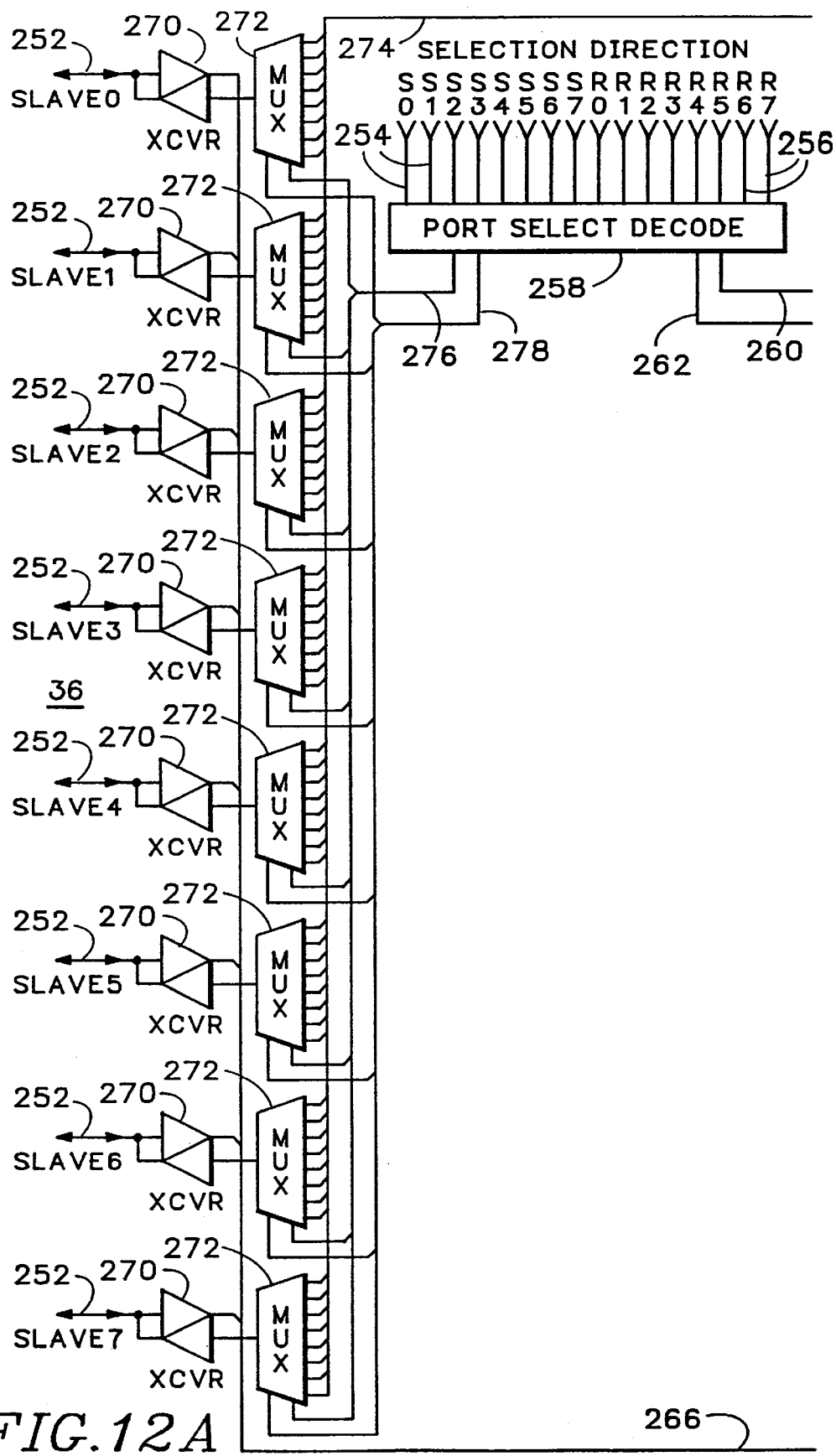
FIGS. 12A and 12B together comprise a detailed block diagram of the crossbar employed according to the present invention.
Figure 12B:
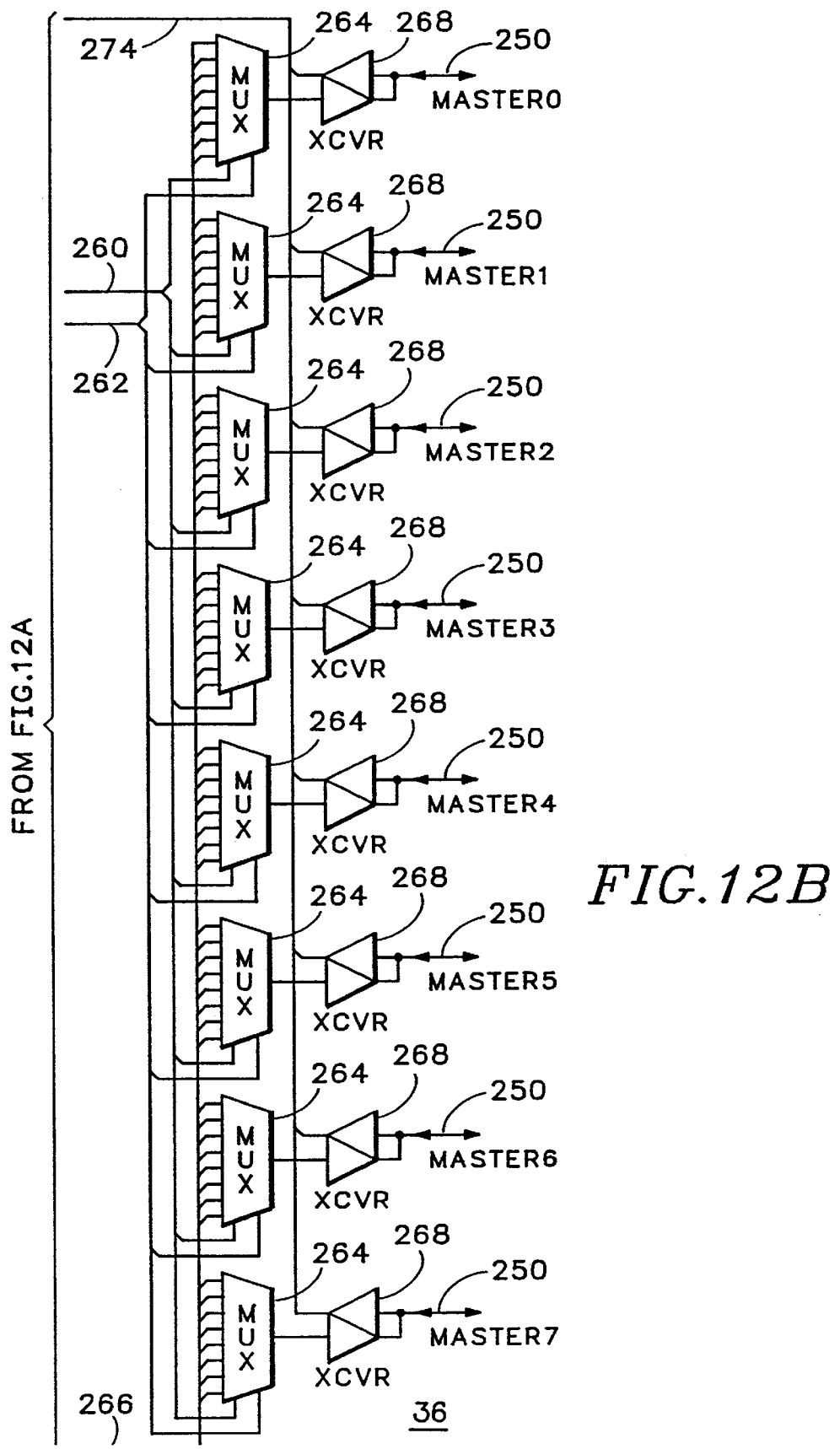

The data crossbar has been hereinbefore referenced in connection with FIG. 9, while the address crossbar in respect to its particular relationship with the rest of the system will be outlined hereinbelow in regard to FIG. 13. The crossbars are substantially identical and the operation thereof may be better understood in conjunction with the block diagram of FIGS. 12A and 12B. The crossbar 36 provides a pathway for data and address information between processors and memory and operates in an asynchronous manner with no internal registers or latches, but comprising two sets of bi-directional data ports, master ports 250 and slave ports 252. The ports are independently controlled by sets of port select control lines 254 (S0–S7) so as to allow connection between any master port to or from any slave port. Direction control lines 256 (R0–R7) allow selection of data transfer direction (either to the master port from the slave port or to the slave port from the master port). Both control lines 254 and 256 feed port select decode module 258 which generates signals on selection lines 260 and direction lines 262, supplied to each of a plurality of master port multiplexers 264 (so as to provide selection and direction control). Each master port has its own multiplexer, and each master port multiplexer receives a plurality of data lines 266, wherein the data lines connect to the receiver portion of each slave port I/O transceiver 270. The output of each master port multiplexer supplies the transmit portion of a master port I/O transceiver 268 (one transceiver per port) and the output of the I/O transceiver comprises the master port input/output 250.

The receive side of each master port I/O transceiver connects to slave port multiplexers 272 (suitably one multiplexer per slave port) via data lines 274. Each slave port multiplexer input receives port select control lines 276 and port direction control lines 278 from port select decode module 258. The output of each slave port multiplexer feeds the transmit side of a slave port I/O transceiver 270, the I/O transceiver output comprising the slave port input/output line.

In a preferred embodiment of the present invention, the crossbar comprises eight ports, with the master ports connected to memory 62 and the slave ports associated with the various processor nodes; memory is assigned the master port because memory is the resource for which all processors arbitrate. While eight ports are illustrated, this is not intended as a limitation. The crossbar is controlled by the port select buses 254 which originate in the arbitration block (as discussed in conjunction with FIGS. 13A and 13B following). The selection buses 254 each suitably comprise three bits to allow selection of the eight ports. Internal arbitration logic is not included in the crossbar in the illustrated embodiment, but a crossbar implementation using, for example, packet switching, may include internal arbitration.

In the particular embodiment, the crossbar function is split into a data portion 136 (FIG. 9) located in the memory block and an address portion 280 (FIG. 13B), associated with the arbitration block. In operation, the port select decode module 258 receives selection data 254 and direction information 256 and generates appropriate output on buses 260, 264, 276 and 278 to enable the multiplexers on the master and slave ports to transfer data between a selected slave and master port. The selection information determines the individual port connections while the direction information chooses whether the information will transfer from the master to the slave or to the master from the slave.

Figure 13A:
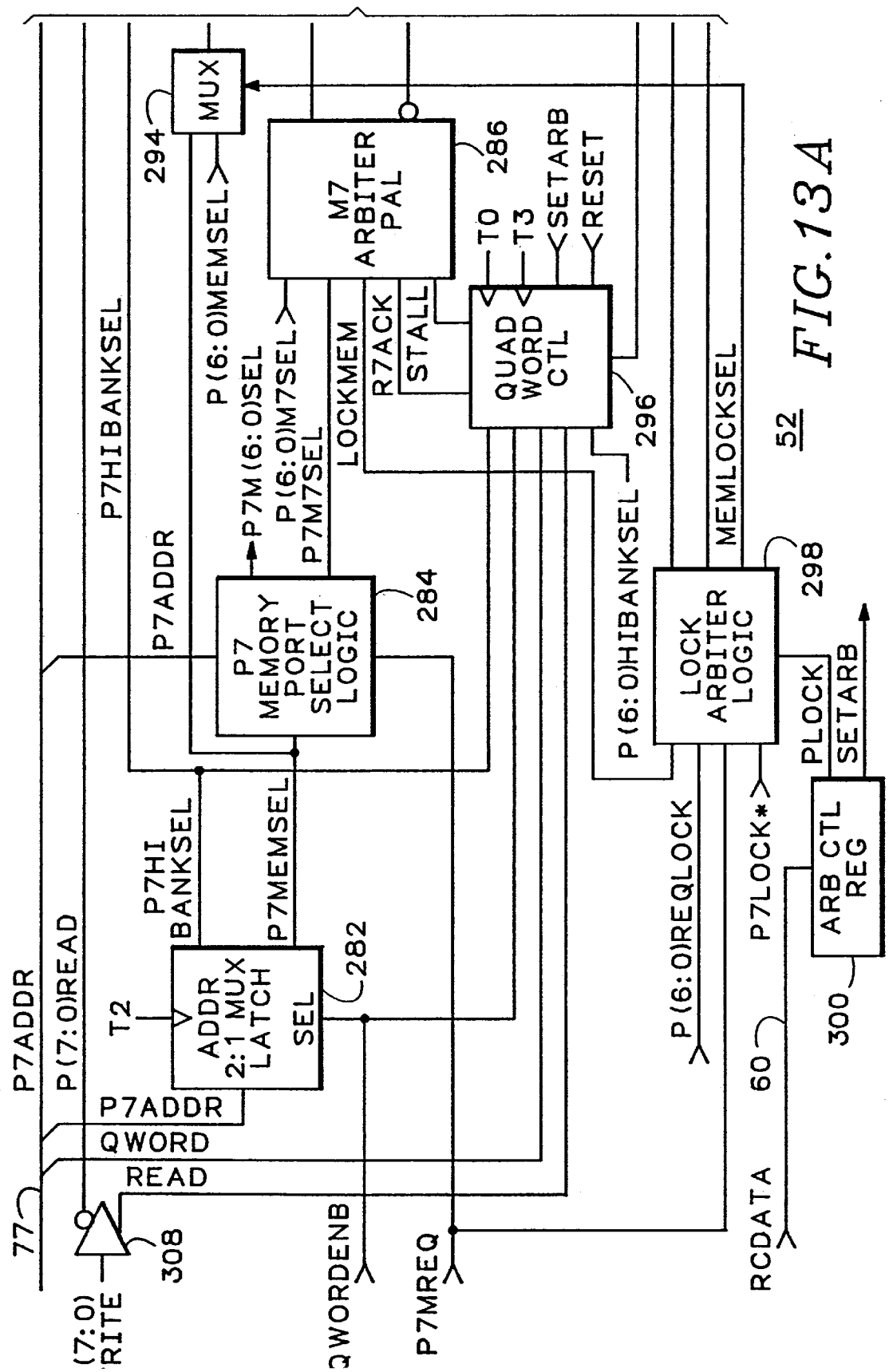
FIGS. 13A and 13B form a more detailed block diagram of arbitration logic for a single memory port of the arbitration block of FIG. 6B.
Figure 13B:
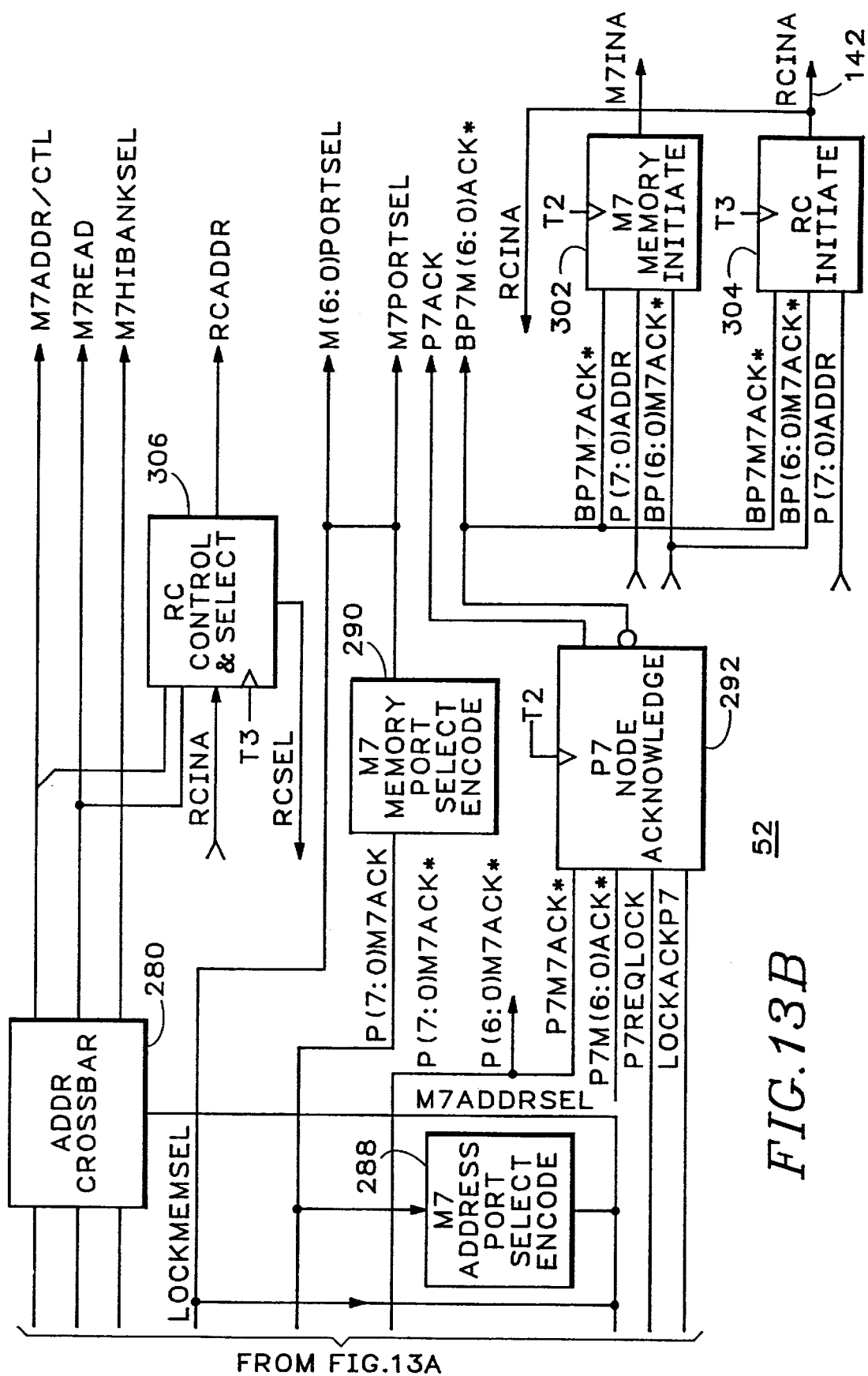

FIGS. 13A and 13B taken together form a detailed block diagram of the arbitration logic for a single memory port of arbitrator block 52 (FIG. 6B). Corresponding arbitration logic exists for each memory port, but one port, as illustrated in FIGS. 13A and 13B, also includes register/control access logic (port 7 in the specific embodiment). The arbitration logic receives memory addresses and requests from the processor nodes (nodes 1 through 7) and from interface processors 48, 50 and 44 (node 0 in the preferred embodiment). The arbitrator processes requests from all system elements for access to memory ports in memory 62 (FIG. 6B). The arbitration logic is also responsible for initiating register/control accesses.

Processor address/control bus 77, which originates in the processor node block (P7ADDR in the illustrated portion of the arbitrator), connects to address crossbar 280, address multiplexer/latch 282, and memory port select logic 284, for supplying address and control information between the arbitration block and the processor node. Multiplexer 282 receives a select signal input QWORDENB, indicating that quadword memory accesses are enabled (as opposed to double word memory accesses), from interface processor block 44 and generates a P7MEMSEL signal (processor node seven memory select, indicating the memory port to be selected) for port select logic 284 as well as a P7HIBANKSEL signal, processor node seven high bank select (used to select a bank of memory within a memory port), for the address crossbar 280. The port select logic generates a P7MnSEL output signal, the processor node seven memory port 'n' select signal for denoting which memory port this node wishes to access, which is supplied to a memory arbitrator PAL 286 for each node. Logic 284 decodes P7MEMSEL (memory select) in conjunction with information as to the portion of memory and the memory request indication to determine, in part, which memory port is to be accessed. In the illustrated port 7 logic, arbitrator PAL 286 receives P7M7SEL from port select logic 284, and also receives a PnM7SEL signal from the select logic 284 associated with each other node (P0M7SEL, P1M7SEL, . . . ). The arbitrator PAL 286 supplies a memory acknowledge signal (P<7:0>M7ACK), processor node memory port seven acknowledge, which indicates which of the eight nodes (zero through seven) has won arbitration for this memory port (port seven in the illustration) to M7 address port select encode block 288 and M7 memory port select encode block 290. The arbitrator PAL 286 also provides inverted versions of the acknowledge signal (P<7:0>M7ACK*) to P7 node acknowledge block 292, P7M7ACK* provided to the node 7 acknowledge block, and appropriate acknowledge signals to the node acknowledge block associated with each other port. (E.g. P6M7ACK* is provided to the P6 node acknowledge block, P5M7ACK* is provided to P5 node acknowledge, etc.)

Address multiplexer latch 282 also supplies the P7MEMSEL signal to multiplexer 294, which receives a similar PnMEMSEL signal from the address multiplexer latch for each node (e.g. P1MEMSEL from node one, P2MEMSEL from node two, etc.). The output of multiplexer 294, LOCKMEMSEL, a lock memory select signal, is supplied to quad word control block 296, and, combined with the output of port select encode 290, supplies the M7PORTSEL signal (memory port seven select) provided to the port select staging logic of the memory block (FIG. 9) as PORT7SEL signal 128. The LOCKMEMSEL signal is further supplied as M<6:0>PORTSEL to each of the other memory ports. Address port select encode block 288 produces a M7ADDRSEL signal (address bus to memory port select) as output for instructing the crossbar to align one of the address buses (P0ADDR . . . P7ADDR) with memory port seven, and this output is supplied to address crossbar 280 (as selection signals 254 of FIG. 12A) and to quad word control block 296. The quad word control block also receives RESET (a system reset signal, used for initialization of the arbitration block), SETARB (set arbitration) from arbitration control register 300 (used to reset the highest arbitration priority to synchronize arbitration), QWORD, indicating a processor node quadword access, READ, indicating whether a read access or a write access is being requested, and QWORDENB, P7HIBANKSEL, and P<6:0>HIBANKSEL (the memory bank select signal from each other processor node) signals as input. Quad word control 296 produces STALL (for stalling arbitration to support quadword memory access) and R7ACK, an acknowledge signal encoding the last acknowledged node requesting the memory port, signals as output supplied to arbitrator PAL 286. The quad word control only comes into play when in the quadword mode and in such case reconfigures the operation of arbitrator PAL 286 so as to stall arbitration in case of a read followed by a write to the same port or to allow a node two consecutive accesses to a memory port if PnHIBANKSEL and QWORD are both disabled.

Lock arbiter logic block 298 receives P7LOCK* and P7MREQ signals from the port interface logic 89 of the processor node (FIG. 7), P<6:0>REQLOCK (request lock signals from the arbitration logic associated with the other processor nodes) and PLOCK from arbitration control register 300 and generates output signals as follows: MEMLOCKSEL (memory lock select) for indicating the selected processor that has memory locked, supplied to multiplexer 294, LOCKACKP7 and P7REQLOCK (lock acknowledge for port seven and port seven request lock) supplied to node acknowledge block 292 and LOCKMEM (lock memory), which is fed to arbitrator PAL 286. The PLOCK signal as well as the SETARB signal (provided to quad word control 296) originate from arbitration control register 300, and that register receives register control data bus 60, for allowing the SETARB and PLOCK signals to be asserted and deasserted. The lock arbitration logic halts normal arbitration and provides separate arbitration when the PnLOCK* signal is asserted by a processor node (P7LOCK* in the illustration). LOCKMEM and P7REQLOCK are then raised, indicating to arbitrator PAL 286 and node acknowledge block 292 that a memory lock is going to occur. LOCKACKP7 is asserted to acknowledge the lock arbitration completion and MEMLOCKSEL encodes the node which has won lock arbitration, causing multiplexer 294 to select the winning node.

Node acknowledge block 292 also receives P7M<6:0>ACK* signals as input, one from each other port, indicating for which of the seven other memory ports this node has won arbitration, and generates BP7M<6:0>ACK* signals as output (inverted acknowledge signals), one BP7MnACK* signal provided to each other port node acknowledge block. Node acknowledge 292 also generates BP7M7ACK* (node seven memory port seven access acknowledge) which supplies M7 memory initiate block 302 and RC initiate block 304. Each port has a similar memory initiate block, but in the preferred embodiment, only one RC initiate block is provided. Both the RC initiate block and memory initiate block receive the BP<6:0>M7ACK* signals from the other ports in the system and the address buses for the system (P<7:0>ADDR) for determining when access to the memory port (port seven in the illustration) has been granted. Memory initiate 302 generates a memory initiate signal, M7INA, while the RC initiate block produces a RC initiate output signal (RCINA). The M7INA signal is produced when the memory port seven acknowledge signal (BP(7:0)M7ACK) is asserted by the node acknowledge block 292 for one of the nodes when the address asserted on the node address buses (P(7:0)ADDR) is not within the register/control address space. RCINA is generated (by RC initiate block 304) if the acknowledge signal is asserted and the address on the address buses is within the register/control address space. (As noted herein, in the preferred embodiment, register/control address space occupies the lower half of addressable memory.) M7INA and RCINA are supplied to the memory system (FIG. 9), M7INA being included with the M7ADDR/CTL line 87 and RCINA as RCINA line 142.

RCINA further comprises an input to RC control and select block 306 (as well as to register control interface block 91 of FIG. 7). The RC control and select block 306 also receives an M7READ signal and the M7ADDR/CTL 87 signal as input, supplying the RC address bus 46 as output. The M7ADDR/CTL (memory port seven address and control) and M7READ (memory port seven read) signals are output from the address crossbar 280, as derived from the P7ADDR and P<7:0>READ signals which input to the crossbar. The P<7:0>READ signal is generated from a WRITE signal supplied with the P7ADDR bus 77, the WRITE signal being fed through inverter 308 to generate the read signal.

In operation, address signals from each data processor node in processor blocks 54, 56 and 58 (FIG. 6A), and the interface processors 44, 48 and 50 (FIG. 6B) are received through the arbitration block 52 before access is obtained to memory ports 120 (FIG. 9). At the beginning of each clock cycle, arbitration is initiated for each memory port when requests are detected by memory port select logic 284.

Address multiplexer latch 282 receives the address bus signals for each processor node, decoding the lowest bits to determine memory port access, with the decoding based upon data word size. For example, a quadword enable signal QWORDENB is supplied to multiplexer 282 indicating either double or quad word size. In a preferred embodiment, when the quadword enable signal is deasserted, the system is using a 160 Mbyte/sec bandwidth, and when the quadword enable signal is asserted, the system is using 320 Mbytes/sec bandwidth. Memory port select logic 284 then encodes memory select signals from address multiplexer latch 282, indicating which memory port the processing node is attempting to access. For example, if a processor node is attempting to access memory port 7, multiplexer 282 decodes the address and control signals from the processor node and generates memory select signals (P7MEMSEL) indicating memory port 7 access. Memory port select logic 284 decodes the memory select signals from multiplexer 282 when a request signal is asserted over address/control bus 77. Memory port select logic 284 then encodes memory port 7 select signals, transmitting the select signals to memory port arbitrator PAL 286.

Memory arbitrator PAL 286 receives memory select lines from each processor node (P(6:0)M7SEL and P7M7SEL), register signals that encode the last acknowledged requester to the memory port (R7ACK), a stall signal for quadword control (STALL), and a processor lock for single processor control over the entire memory (LOCKMEM). Logic within the PAL resolves conflicts for the memory port requests according to the following scheme. After a system reset, the highest priority requester is processor node '0', the next highest priority is processor node '1', then processor node '2' and so on. Setting the arbitration bit in arbitration control register 300 also sets the highest priority node to '0'. When a memory port request is present, the highest priority processor node requesting access to a given memory port is allowed the current cycle for memory access. Once a node wins arbitration, the PAL encodes the P(7:0)M7ACK signals indicating which node has won. At completion of the arbitration cycle the current requester is placed at the bottom of the priority level and the next numerical requester becomes the highest priority. For example, when processor node P1 and processor node P3 are the first requesters after a system reset or a software set, processor node P1 has the highest priority level, making P3 the next highest level requester. Processor node P1 is given access to the memory port and at the completion of the arbitration cycle, node P1 is placed at lowest priority, making node P2 the highest level requester. If processor node P2 is not presenting a request for the memory port then node P3 is passed priority and transfers data during the next arbitration cycle. At the completion of the data transfer from processor node P3 to the memory port, processor node P3 is placed at the bottom of the priority level making processor node P1 the highest priority requester.

Once a processor node has won arbitration for a memory port the appropriate processor node acknowledge signal is asserted to processor node acknowledge logic 292. Processor node acknowledge logic 292 receives the inverted processor node acknowledge signal (P7M7ACK*) from memory port arbitrator PAL 286 and acknowledges memory requests that have been granted to the corresponding processor node.

Each memory port select logic encoder 290 receives a memory port acknowledge signal from its associated port arbitrator PAL 286 and encodes the memory port select 128. The memory port selections are sent to memory 62 (FIG. 6B) to control the data crossbar as discussed in conjunction with FIGS. 12A and 12B. Select logic 290 encodes the inputs to port select lines that indicate the processor node data bus member that is to be aligned with the memory port. Port select staging logic 130 (FIG. 9) accepts the port select signals, decodes them to determine the associated processor node data bus number and controls the data crossbar to connect the data bus to the memory port.

Memory address port select encode logic 288 receives the memory port acknowledge from memory arbitration PAL 286 and generates memory port address select signals. The memory port address select signals are supplied to the associated memory port address crossbar 280 and align the address/control bus for the highest priority processor node. An address crossbar 280 exists for each memory port allowing each memory port to receive or send data concurrently.

Processor node memory lock arbiter logic 298 allows a processor node which has its processor lock bit asserted after winning arbitration to immediately disable the memory port's acknowledge logic. As a result, all other memory port arbitration cycles and acknowledges complete normally, and then on the next clock cycle all memory ports are disabled and all requesting processor nodes with processor lock set are routed to lock arbitration logic 298. Arbitration occurs and one processor node is given access to all memory ports. The highest priority processor node completes its transfer and deasserts its associated processor lock signal. Lock arbiter 298 then provides memory access to the next highest priority processor node with the processor lock signal asserted. When all processor lock signals are deasserted normal arbitration resumes.

A certain amount of processor memory is allocated to register control address space and is decoded by register control control and select 306. For example, in the preferred embodiment of the invention, register control is mapped to the lower half of memory space and the deassertion of the most significant bit of each processor node address bus indicates that the address is in register control memory space. Memory port select logic 284 recognizes the deasserted most significant bit and forces the memory request to be arbitrated on the memory port where the register control address space resides (port 7 in the preferred embodiment). Arbitration for processor nodes that access the register control memory space then operates in the same manner as a regular data transfer request. After arbitration is complete, the arbitration block disables memory initiate to memory port 7 (M7INA) and begins a register control bus access cycle (RC cycle). RCINA is asserted and the requester's address and control bits are then driven onto the RC address and control bus by RC control and select 306 in response to the RCINA signal.

To further illustrate how the arbitrator block works, assume processor nodes P1, P2 and P3 want to access memory port 1 in FIG. 9 at the same time. A first multiplexer 282(1), i.e. the multiplexer 282 as associated with processor node 1 instead of processor node 7, will decode the P1 address and send signals P1MEMSEL to memory port select logic 284(1). The address from the second processor node, P2, is decoded by a second multiplexer 282(2) and asserted signals P2MEMSEL are sent to memory port select logic 284(2). The address from the third processor node, P3, is decoded by multiplexer 282(3) and asserted signals P3MEMSEL are sent to port select logic 284(3). Any additional processing nodes in the system that were accessing memory ports other than memory port 1 would have their addresses decoded by their respective address multiplexer latch (282(n)) and port select logic (284(n)). Port select logic 284(1) decodes P1MEMSEL and asserts the signal associated with memory port 1 (P1M1SEL). Port select logic 284(2) decodes P2MEMSEL in a corresponding manner asserting the signal associated with memory port 1 (P2M1SEL). Port select logic 284(3) also operates in a corresponding manner.

Arbitrator PAL 286 for memory port 1 receives asserted signals P1M1SEL, P2M1SEL and P3M1SEL. If no other CPU from any other node in the system is accessing memory port 1, the associated signals to arbitrator PAL 286 are deasserted (e.g. P4M1SEL, P5M1SEL . . . PnM1SEL). The logic of arbitrator PAL 286 determines which processor node has highest priority in a round robin basis. Initially, node zero has highest priority, followed by node 1, node 2, etc., and once a requesting node has had access, it is demoted to lowest priority. In the example, node one is determined to have highest priority of the three nodes which are requesting access. The arbitrator PAL also checks to see if processor node one has transmitted a lock signal over the address/control bus. Assuming no lock signal has been sent, arbitrator PAL 286 enables signal P1M1ACK to address port 1 select encode 288(1), processor node acknowledge 292(1) and memory port 1 select encode 290(1). Address port select 288(1) for memory port 1 encodes the acknowledge signals onto bus M1ADDRSEL. Address crossbar 280 decodes M1ADDRSEL and connects the address and control bus for processor node one to memory port 1.

Memory port 1 select encode 290 encodes signals M1PORTSEL, sending the values to port select staging logic 130 (FIG. 9). Port select staging logic 130 connects the data bus for processor node one (P1DATA) to memory port 1. Processor node acknowledge 292 enables signal P1ACK to processor node P1 indicating that the request for memory port 1 has been acknowledged. The CPU on processor node P1 then transmits its data to the location in memory port 1 indicated by the address bus (M1ADDR/CTRL). After the CPU has completed reading or writing data from memory port 1, processor node P1 drops its request for memory port 1 and arbitrator PAL 286 logic indicates processor node P1 is at the lowest priority, allowing processing node 2 to access memory port 1. After processor node 2 has completed transmitting data to memory port 1, processor node 3 is allowed to transmit data from its requesting CPU to memory port 1.

The matrix processor is designed to execute most efficiently algorithms that have the following properties: a high level of data reuse (locality or compute intensity), sections of code that can be split to run in parallel, and large data sets.

When determining if part of an application is appropriate to run on the matrix processor, the algorithm may be examined to determine whether it has a combination of these properties. For example, the FORTRAN code for a fast fourier transform is shown in table I.

```
I=1
J=1
K=TABLE_POINTER
DO 20 L=1, N/(2*LA)
    DO 10 M=1, LA
    XR=C(I)-C(I+LA*2)
    XI=C(I+1)-C(I+LA*2+1)
    A(J)=C(I)+C(I+LA*2)
    A(J+1)=C(I+1)+C(I+LA*2+1)
    A(N+J)=TAB(K)*XR+TAB(K+1)*XI
    A(N+J+1)=TAB(K)*XI-TAB(K+1)*XR
    I=I+2
    J=J+2
10 CONTINUE
    I=I+LA*2
    K=K+2
20 CONTINUE
```

Table I

Table I executes a decimation in frequency fast fourier transform (FFT) where N is the length of the input vector and LA is equal to $\{N/2, N/4, N/8, \ldots, 2, 1\}$. The entire sequence is executed $\log_2 N$ times and the number of inner loop iterations performed during any one execution of the sequence is $(N/2*LA)*LA$ or $N/2$.

The inner loop of the FFT sequence (DO 10 M=1, LA) requires six real additions and four real multiplications (10 floating point operations). Multiplying the number of iterations required to complete the FFT by the number of arithmetic operations for each iteration:

$$10 \underset{\text{iterations}}{\underset{\text{inner}}{\frac{\text{operations}}{}}} * \underset{\text{iterations})}{\underset{\text{(inner}}{\frac{N}{2}}} * \underset{\text{iterations)}}{\underset{\text{(outer}}{\log_2 N}} = 5N\log_2 N \text{ (floating-point operations)}$$

The data transfer requirements for the FFT consist of transferring input and output vectors. Assuming trigonometric table values are provided in memory, 2N single precision complex elements or 4N 32-bit words must be transferred between the host processor system, matrix processor memory and local memory processing element cache memory. Locality, which can be considered a ratio representing the number of times a piece of data is reused, is calculated by dividing the total number of floating point operations by the number of data words transferred.

$$\text{Locality} = \frac{\text{Algorithm Arithmetic Operations}}{\text{Words transferred}} = \frac{5N\log_2 N}{4N} = \frac{5\log_2 N}{4}$$

For a one dimensional FFT with 120 complex 4K-element vectors, the entire vector cannot fit inside data cache 96 (FIG. 8) of a processing element if, for example, the data cache is eight Kbytes. Due to memory space requirements of coefficient tables and intermediate data values that reside inside the data cache, only a portion of the data vector can be processed without the need to access system memory.

Taking a 256 point subsection of the 4K vector array, the FFT can be performed without transferring additional data from memory 62 (FIG. 6B). The locality for a 256 point FFT is:

$$\frac{5\log_2 256}{4} = 10 \text{ operations per 32 bit word}$$

To determine the maximum system performance, the number of processor operations per data word transferred is multiplied by the bus bandwidth for each node in FIG. 5A. In the illustrated embodiment, each CPU is capable of transferring 160 Mbytes/sec or 40 Mwords (32 bit)/sec. With system memory that transfers data at a rate equal to the CPU transfer rate, the maximum system capacity for a single processing node is:

Locality*Bandwidth=Maximum possible performance
10*40 Mwords/sec=400 MFLOPS per processing node
Therefore, the system bus becomes saturated at 400 MFLOPS when executing an algorithm with a locality of 10 and additional processing units will no longer significantly contribute to system performance.

The saturation of a processing node bus is also dependent on the number of clock cycles required to perform a floating point operation in each CPU. Dividing the number of clock cycles to execute a floating point arithmetic operation by the number of cycles required to transfer data words from system memory and adding one equals the number of CPUs necessary to obtain maximum processing capacity on a processing node.

$$\text{Processing elements/bus} = \text{locality} * \frac{\text{Cycles per FLOP}}{(\text{Cycles per word accessed on the bus})} + 1$$

The added processor accounts for the fact that the processing elements in the illustrated embodiment do not simultaneously compute efficiently from cache and efficiently access the bus, but other processing elements may be employed that are able to perform computations and bus access simultaneously. The inner loop of the FFT in table I requires four multiplies and six adds each iteration. Since a CPU 40 in FIG. 8 performs both a single precision floating point add and a floating point multiply every cycle, each loop iteration can be performed in six clock cycles.

The total number of processing elements needed for one processing node is then:

$$\text{Processing elements/bus} = \frac{10 \text{ ops}}{\text{word}} * \frac{6 \text{ Cycles}/10 \text{ ops}}{2 \text{ Cycles}/2 \text{ words}} + 1$$

$$= 7 \text{ processing elements}$$

Thus each node in the matrix processor in FIG. 5 has a maximum processing capacity of 400 MFLOPS when seven data processors are used to calculate the FFT in table I. Total performance for the matrix processor is increased in proportion to the number of processing nodes in the system. I.e., for a seven node system, e.g., as illustrated in FIG. 5A, the system performance increases by a factor of seven. Maximum possible performance=locality*bandwidth=10*(7 buses*40 Mwords/sec)=2800 MFLOPS The most effective number of buses and the number of processing elements used on each bus varies, depending on the locality (affecting the maximum number of processors for each bus), the data array size, and the internal data cache of each processing element. For example, an FFT data array size of 120 vectors with 4096 elements in each vector employs more than one processing node. If each element processes a 256 element block at a time, 1920 iterations of the FFT need to take place. For a matrix processor with seven nodes and seven processors on each node, each processor will need to process only 39 blocks of the data array.

Once the problem to be solved is determined to contain the array size and locality to be handled efficiently in the matrix processor, the algorithm is coded, whereby the algorithm and data are distributed from a host computer over interface bus 42 through interface processor 44 (FIG. 6B) into system memory 62. For example, the FFT instruction data (algorithm code) would be transferred from system memory 62 (FIG. 6B) to each processing element code cache 94 (FIG. 8) along with FFT coefficient table constants. The instruction and initialization data transfers occur only once per FFT operation and therefore do not significantly affect bus bandwidth. Based on the CPU data cache size, 256 64-bit data blocks are transferred from memory 62 to data cache 96 (FIG. 8) of each processing element that will be used in the algorithm. The first processing element receives a 256 word data block and begins processing. The second processing element then receives the next 256 element section of the data set from memory 62 (FIG. 6B) and so on until each processing element configured in the system contains data. Since there are seven processing nodes for the system illustrated in FIGS. 6A and 6B, seven data transfers can be performed concurrently. For a general purpose matrix processor the number of processing nodes and CPUs on each processing node may be more or less than necessary for some algorithm applications. The system is configurable to enable only the processing elements necessary to perform the present algorithm.

Referring to FIG. 8, each enabled processing element executes the algorithm in table I by transferring floating point operands from data cache 96 into floating point register 98. The arithmetic operations are accomplished by floating point multiplier 116 and floating point adder 118. Data that the CPU has completed processing is temporarily stored back in data cache 96. Referring to FIG. 7, when a processing element has finished processing, it must access the processing node bus in order to transfer the data back into system memory 62 (FIG. 6) and obtain another block of the data set.

Referring to FIG. 10, the interface processor contains a single node barrier register 154 which contains one bit per node. Each bit indicates when a node has reached a barrier. Each processor node also has a CPU barrier control register which provides one bit per CPU in the processing node indicating when a CPU is at a barrier. A barrier is a point in an algorithm where the nodes (or processing elements) wait. Each node (or processing element) involved in performing the algorithm continues to wait at the barrier until all other nodes (or processing elements) are also waiting at the barrier. The nodes (or processing elements) will proceed with computation after all nodes (or processing elements) are waiting at the barrier. Each processor node register array 88 (FIG. 7) also has a hold mask enable register, again comprising one bit per CPU. When both the hold mask enable bit and the CPU barrier control bit are set, the corresponding CPU is placed in a hold condition (suspended from using the node bus). The processor nodes include CPU configuration registers in CPU register array 88 for allowing software to configure CPUs into or out of the node. Each available CPU in the node is represented by a bit in a configuration register. The configuration register defines the next CPU to receive control, when synchronizing CPUs and nodes. For example, if the configuration register shows CPUs 1, 3, 4 and 7 as being configured, and CPU 1 is presently operating, the next CPU is 3, followed by 4, followed by 7. If CPU 7 is presently transferring data, once CPU 7 completes the data transfer, control of the node bus is given to CPU 1. The sequential ordering above is given by way of example and is not intended as a requirement. The hold mask enable register, CPU barrier register, node barrier register, and the configuration register are used in conjunction with each other to reduce bus conflicts, synchronize processing elements within each processing node and between processing nodes, and to effectively process non-parallel applications.

Figure 14A:
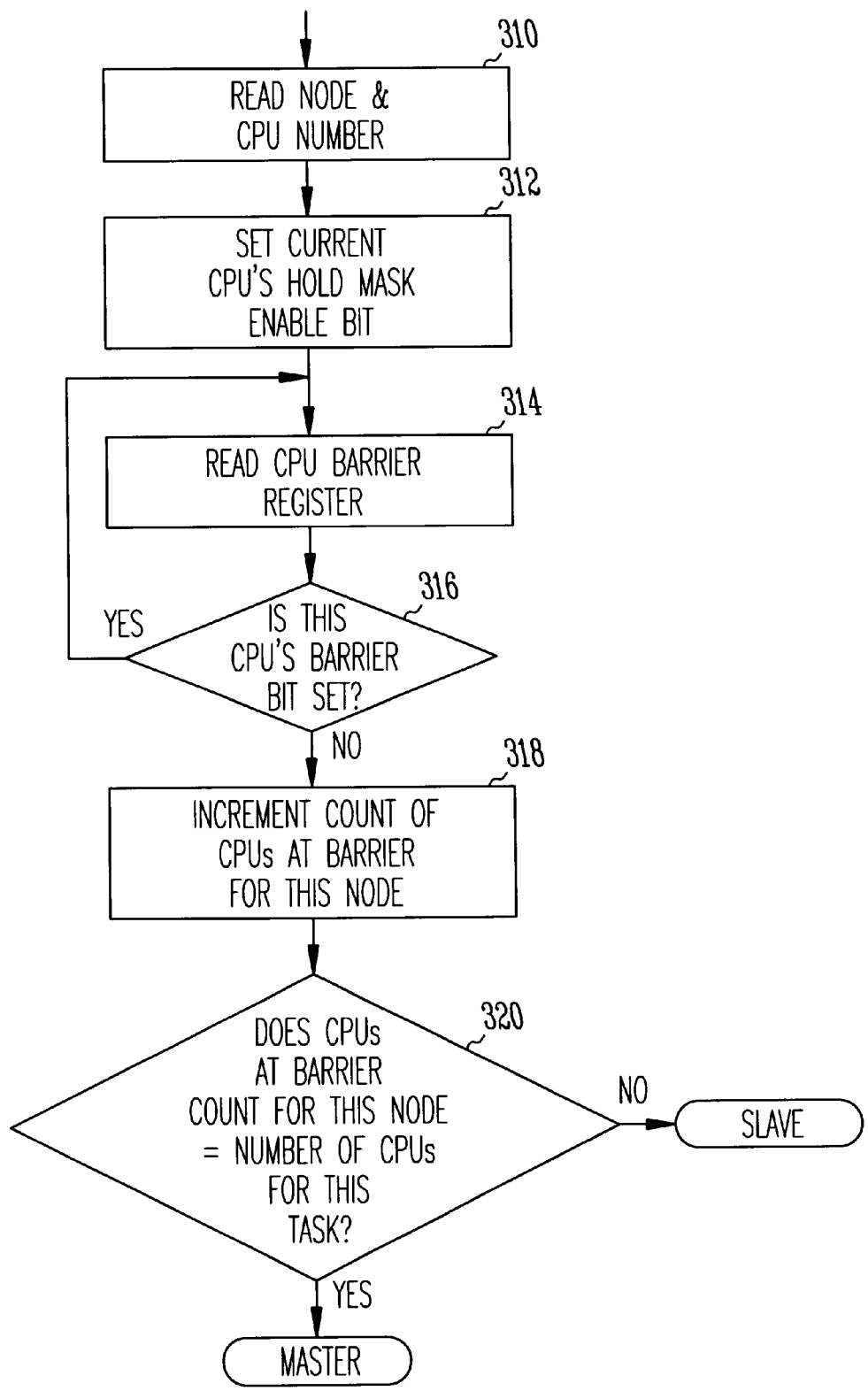
FIGS. 14A–14D are flow charts of a program for synchronizing processors and nodes in accordance with the present invention.

FIG. 14A is a flow chart of the procedure for synchronizing processors and nodes at a barrier. Processor synchronization ensures that first-to-complete processing elements do not read or write data that is not ready for further processing. The procedure may be performed in parallel by a number of processing elements on multiple nodes when a CPU reaches a point in software where it must synchronize with other processors. The sequence begins by reading the node number and CPU number of the current processor executing synchronization code (block 310). The hold mask enable bit for the current CPU executing this code is set in block 312 placing the current CPU in a hold condition when both the hold mask enable and the barrier bit for the CPU are set. The program then enters block 314, reading the CPU barrier register, which contains the barrier status of all the CPUs on the current node. In decision block 316, the CPU barrier register is checked to determine if the current CPU has its bit set in the barrier register. If the bit for this CPU in the CPU barrier register is set, the CPU is not free to continue and the process loops back to block 314 and reads the CPU barrier register again, looping until the compare step in block 316 indicates this CPU is free to run (i.e. its corresponding barrier bit is clear).

In block 316, if the bit is not set, the process then enters block 318, incrementing the count of the CPUs on the current node which are at the barrier. This count is used to keep track of CPUs when assigned a task requiring a subset of the available CPUs to do extra work. For example, if an FFT was processed in 101 blocks of 256 data points each, with 10 CPUs in the system, each CPU would likely process ten data blocks, with one CPU being required to perform one extra data block. After incrementing the count, the process enters decision block 320 which tests if the count of the number of CPUs at the barrier for this node is equal to the number of CPUs assigned to this task. If all CPUs assigned to a task are at the barrier, the last CPU to arrive at the software barrier is the master and performs the task of setting all other CPUs free. However, if the count is not equal to (i.e. less than) the number of CPUs assigned to the task, then this CPU executing the code is a slave and must await task completion by the other CPUs before continuing.

Figure 14B:
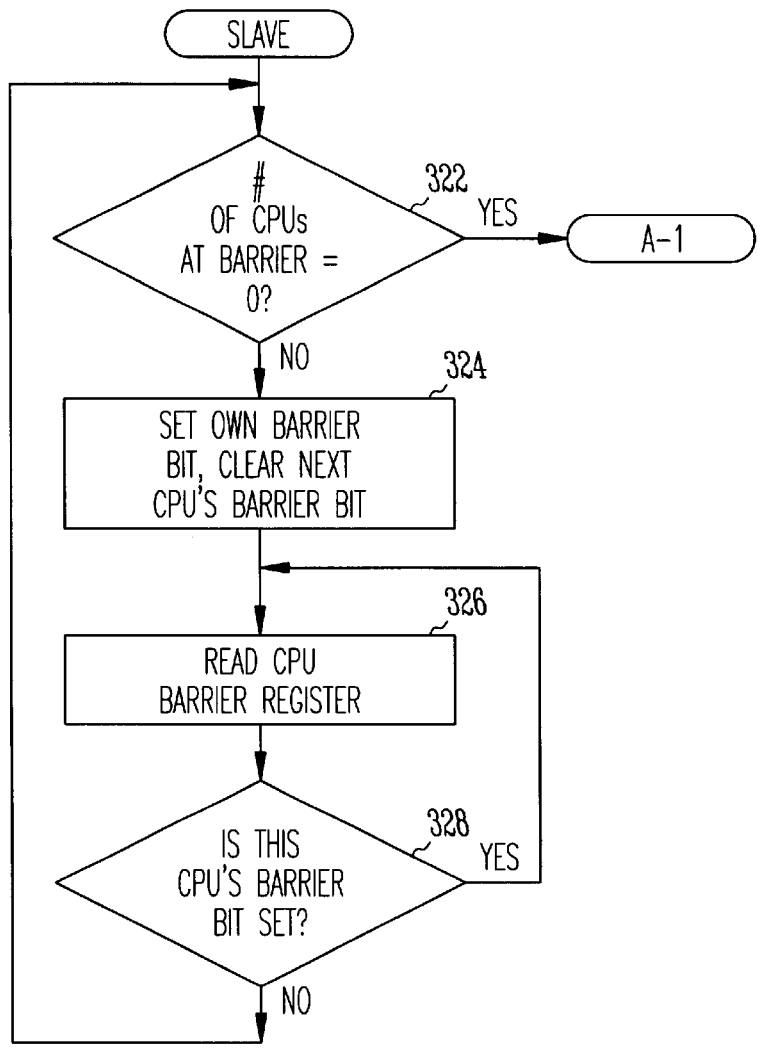

If the CPU is a slave CPU, execution continues with the slave mode steps as illustrated in FIG. 14B. The slave process begins with decision block 322 wherein, if the number of CPUs that have reached the barrier (other than the present CPU) for this node is not zero, the process continues with block 324, setting the barrier bit for the current CPU and clearing the barrier bit for the next CPU thereby allowing the next CPU (as determined by the configuration register) to run. The process next enters block 326 to read the CPU barrier register, followed by decision block 328 wherein the barrier register value is examined to determine whether the present CPU's barrier bit is set. If the barrier bit for the present CPU is set, the process loops back to block 326 to again read the CPU barrier register, and continues looping through the read and test steps until the test in decision block 328 indicates this CPU barrier register bit is clear. Once the bit is clear, the process loops back to decision block 322 to determine whether the number of CPUs at barrier count for this node is zero. The CPUs at barrier count is zero once all CPUs have been set free from their barriers by the master CPU process as will be described in connection with FIG. 14D. If the result of decision block 322 is that the number of CPUs at the barrier for this node count is zero, the process of FIG. 14B continues with process A-1.

Figure 14C:
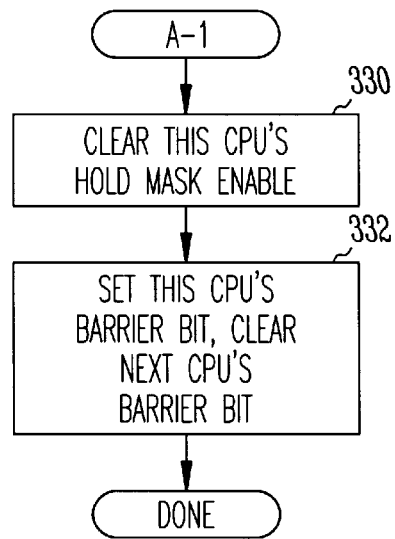

FIG. 14C illustrates process A-1 for the state where there are no CPUs at the barrier. The hold mask enable register bit for the current CPU is cleared in block 330 allowing the CPU to begin running. The process then sets the current CPU's barrier bit in the CPU barrier register and clears the barrier bit in the CPU barrier register for the next CPU (wherein the next CPU is determined by the configuration register) in block 332. The process is then completed for the current CPU and the next CPU in the configuration register begins executing the appropriate code since the next CPU's barrier bit is now cleared as a result of process block 332.

Figure 14D:
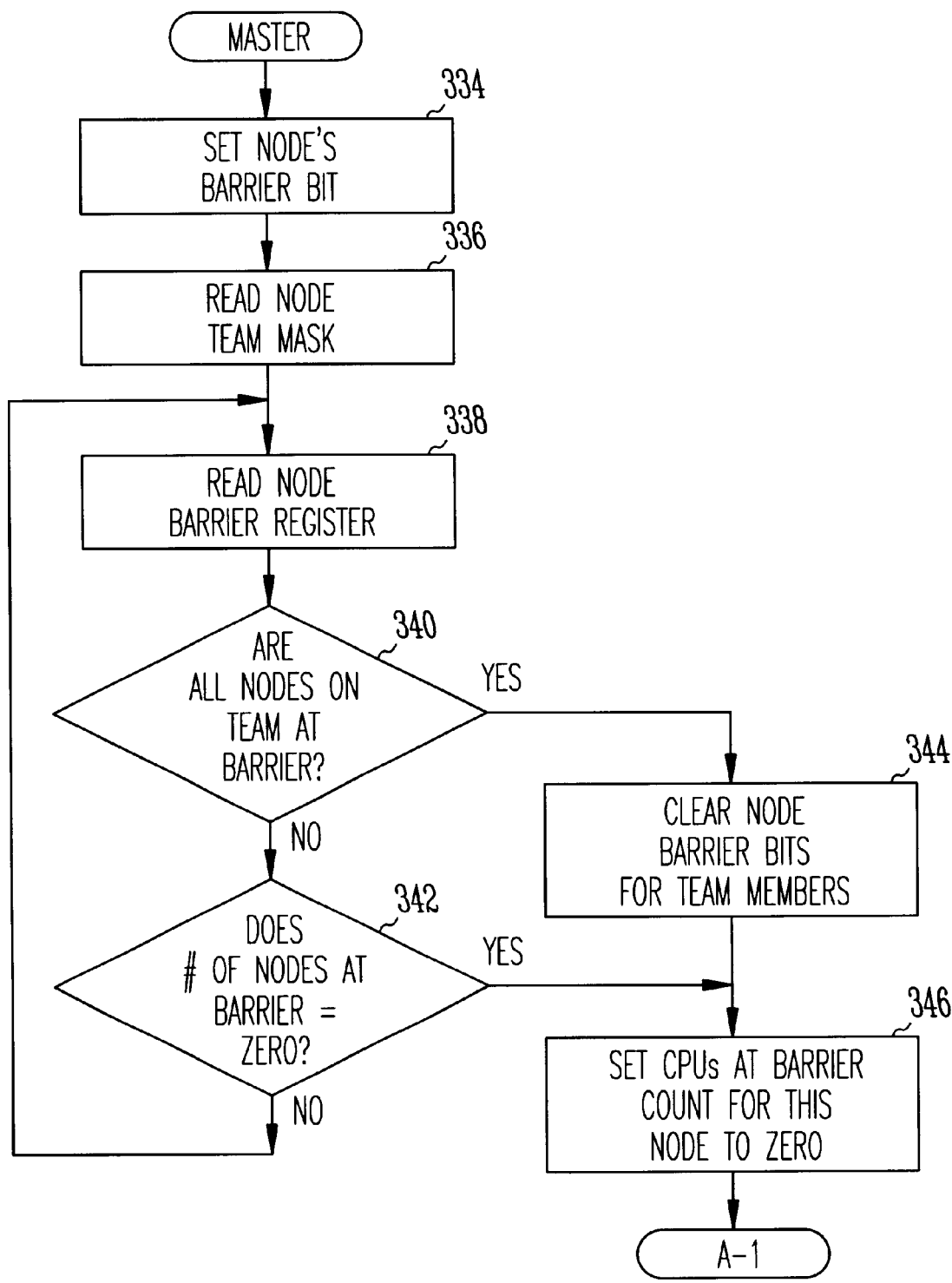

Referring now to FIG. 14D, the master CPU process is performed when the result of decision block 320 of FIG. 14A indicates the number of CPUs at barrier count for the current node is equal to the number of CPUs assigned to the current task. The master process begins by setting the node barrier bit for the current node in block 334, in order to begin the process of synchronizing the various nodes in the system. The process would have reached block 334 only if all the CPUs on the current node are at the barrier. Once the node barrier bit is set, the master processor reads a node team mask value (which indicates which nodes are at present assigned to the task at hand block 336). Node barrier register 154 (FIG. 10) is then read in block 338 indicating which nodes within the system are at a barrier. In decision block 340, the node barrier register is compared with the node team mask to determine whether all the nodes on the current team are at a barrier. If the nodes are not currently at a barrier, the process continues with decision block 342 wherein the node barrier register value is examined to determine whether there are zero nodes at the current barrier. The condition of zero nodes at the current barrier would indicate that another processor on another node had already set the team nodes free (i.e. cleared the node barrier bits for all team members).

If the result of decision block 342 is that the number of nodes at a barrier is at present non-zero, the process loops back to block 338 to read the node barrier register, continuing the steps of checking for either all nodes at the barrier or zero nodes at the barrier as assigned by the node team mask. If the test of decision block 340 determines that all nodes on the team are at the barrier, the process continues with block 344 wherein the node barrier register bits for the nodes on the current team are cleared, thereby indicating that the nodes are free to begin processing again. The process then continues with block 346 wherein the CPUs at barrier count for this node is set to zero, since the CPUs are now released from their barrier state. The process ends in accordance with FIG. 14C with step 330, clearing the hold mask enable for the current CPU and step 332 setting the barrier bit for the current CPU and clearing the barrier bit for the next CPU allowing the next CPU to begin running from the barrier state. Referring again to decision block 342, if the process determined that there were zero nodes at the barrier, then another processor would have already cleared the node barrier bits for the team members and the process would continue with block 346 setting the node's CPU barrier count to zero and continuing with blocks 330 and 332 of FIG. 14C.

Figure 15A:
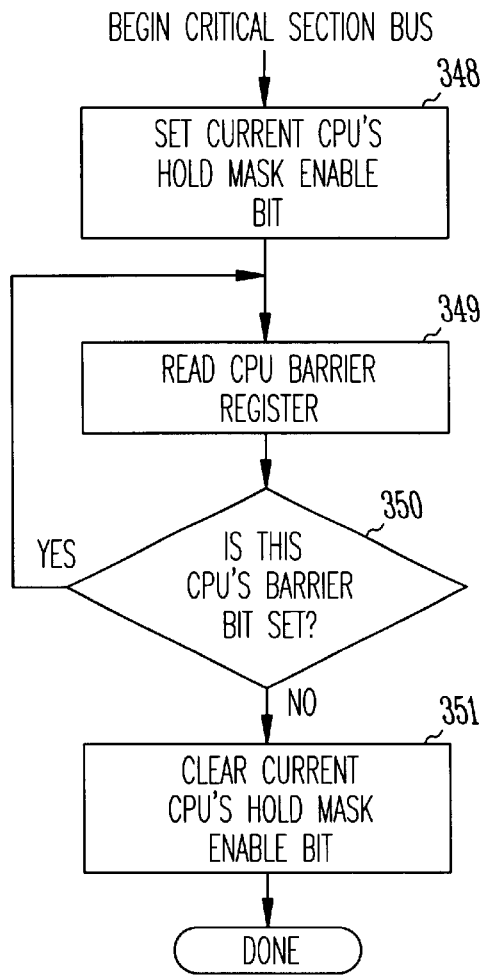
FIGS. 15A and 15B are flow charts of the begin critical section bus and end critical section bus processes in accordance with the present invention.

A "critical section bus" code section provides the ability to access shared resources serially, such as the common bus on each node. The critical section bus concept allows all of the available buses in the system to run in parallel, but only one processor per bus can have control of an individual bus at any one time. In contrast, a standard critical section in accordance with the prior art allows only one processor per system to execute code and access a bus. At the beginning of a critical section bus code section, the application software is written so that the section begins with a call to a begin critical section bus function. Referring now to FIG. 15A, a flow chart of the begin critical section bus function call comprises process step 348 wherein the processing element that needs to use data bus 66 (FIG. 7) writes to the hold mask register in CPU register array 88. The CPU register array determines which processing element is accessing it and sets the appropriate bit in the hold mask register. The effect of setting the hold mask register is that the CPU holds at the current position unless the barrier register bit corresponding to the CPU is clear. Next, the process reads the CPU barrier register (step 349) and checks to determine whether the CPU barrier register for this CPU is set (step 350). If the barrier register bit is set, the process continues looping, reading and checking the CPU barrier register until the check in step 350 indicates that the CPU barrier bit is clear. Once the barrier bit is clear, the process continues with step 351 wherein the hold mask enable bit for the current CPU is cleared. The begin critical section process is then completed. The begin critical section process is equivalent to a "wait ()" function call.

The CPU is held from execution or access of data until the appropriate barrier register bit is cleared by another CPU completing processing and performing a "set my bit, clear next bit" operation on the barrier register. The system is such that by agreement, only one barrier register bit is cleared at any one time, in order to appropriately manage CPU accesses in operation. For example, if a second processor is presently using the node bus, the barrier bit for the CPU wishing to use the bus is set and the CPU must wait until the second CPU is finished. When the second CPU has completed the data transfer between its data cache and system memory 62 (FIG. 6B), e.g., once the critical code section for the second CPU is completed, an end critical section bus process is invoked by the second CPU setting its barrier bit and clearing the next barrier bit specified by the configuration register.

Figure 15B:
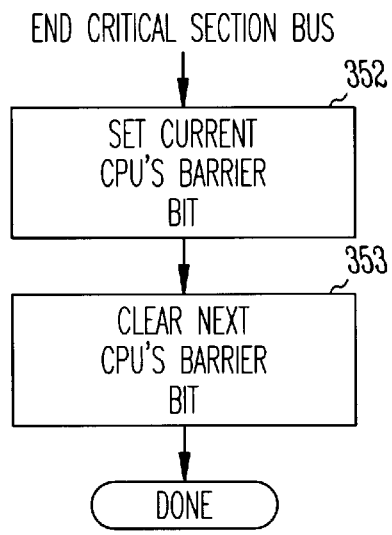

FIG. 15B is a flow chart of the end critical section bus process in accordance with the present invention. The end critical section bus process is equivalent to the "next()" software primitive. The process comprises process step 352 wherein the current CPU barrier bit is set followed by process step 353 wherein the next CPU's barrier bit is cleared. The process for ending a critical section of code is then completed. The effect of the call to the end critical section by the second CPU is that the first CPU waiting at the begin critical section bus point of the software will be allowed to pass through the critical section.

Figure 16:
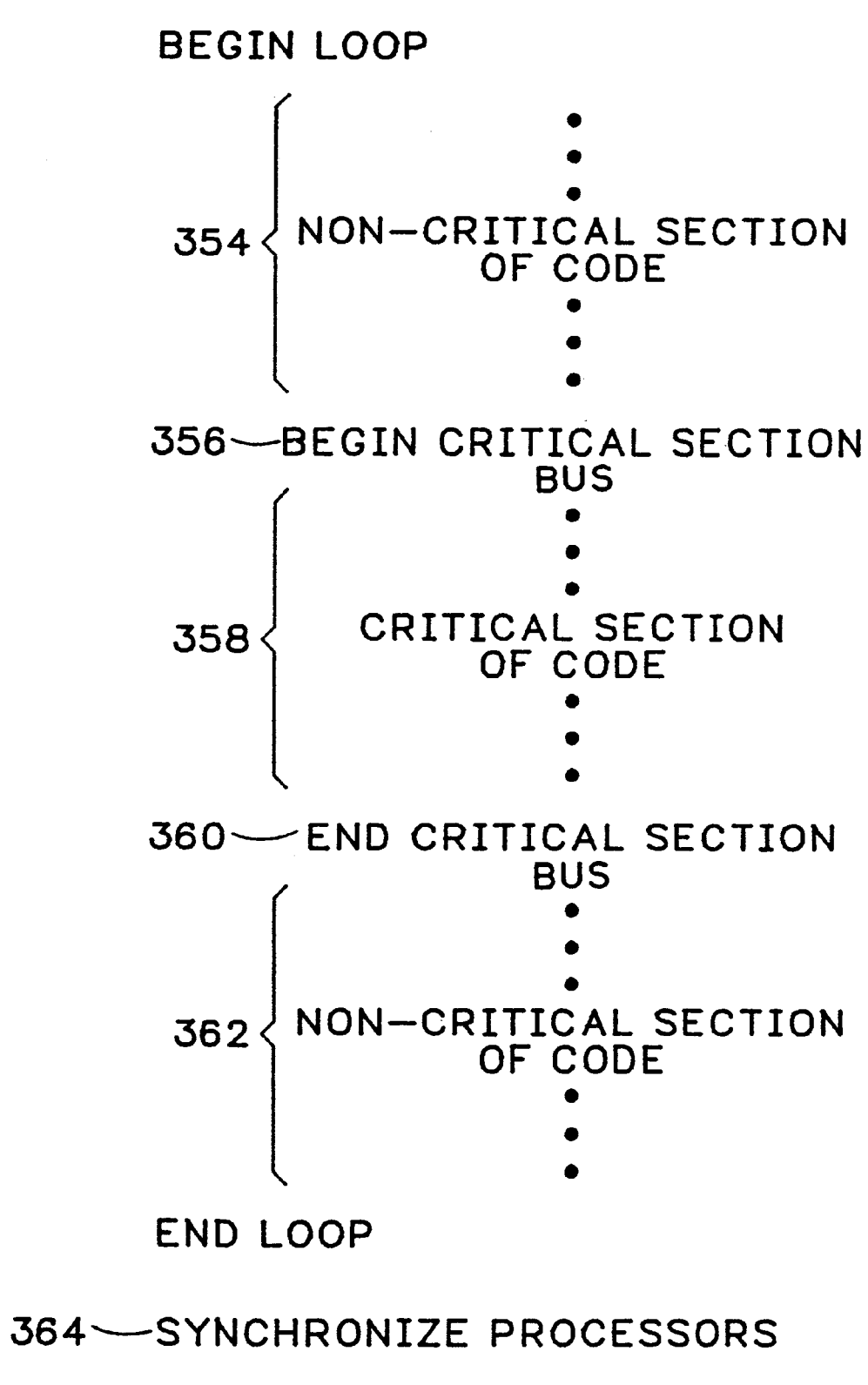
FIG. 16 illustrates the placement of begin and end critical section procedures as contemplated by the present invention.

FIG. 16 illustrates examples of placement of the synchronization, begin critical section bus and end critical section bus processes of FIGS. 14A–D and 15A–B within a section of code being executed by multiple processors on multiple nodes within the matrix processor. Sections of code which are performed in parallel typically reside within a loop and may constitute a section of computer code 354 which comprises non-critical process steps, i.e. sections that do not have to use the node bus, followed by a begin critical section bus step 356 which would invoke the process as illustrated in FIG. 15A. Critical section 358, which contains code that is executed by only one processing element on the bus at a time, is then executed by the associated processor. The end of the critical section bus is defined by the placement of end critical section bus statement 360. The call to the end critical section bus operates in conformance with the end critical section bus process described in FIG. 15B. Once the end critical section bus process is called, a next processing element may then begin execution of the critical code section. The code within the critical section 358 may comprise, for example, instructions to load the processing element with data. The code following critical section 358 then begins a second noncritical code section 362 that can be performed within the data cache of the CPU. At the end of the loop containing the above mentioned code sections, the synchronize processors step 364 (corresponding to the process steps of FIGS. 14A–14D) is typically invoked, synchronizing all processing elements at that point before execution continues. Such synchronization would be appropriate in situations where steps following the synchronization point use data which must have already been completely processed by all the parallel elements (e.g., a matrix operation must have been completed on an entire data set before the data set may be processed further).

Operating the matrix processor according to the above described method allows block transfers, transfers of large blocks of data to and from CPUs, to be handled such that while only one CPU per bus is performing a block transfer at any one time, other CPUs on the bus may still gain access to the bus for a short period in accordance with a round robin arbitration method. Allowing other CPUs access to the bus is advantageous in that a CPU that has had an instruction cache miss can access the bus to load a few instructions (or other data) in order to continue processing. If such access was not allowed, a CPU could be prevented from computing for thousands of cycles while another CPU was completing a large data transfer. Such starving of CPUs could reduce system performance.

Figure 17A:
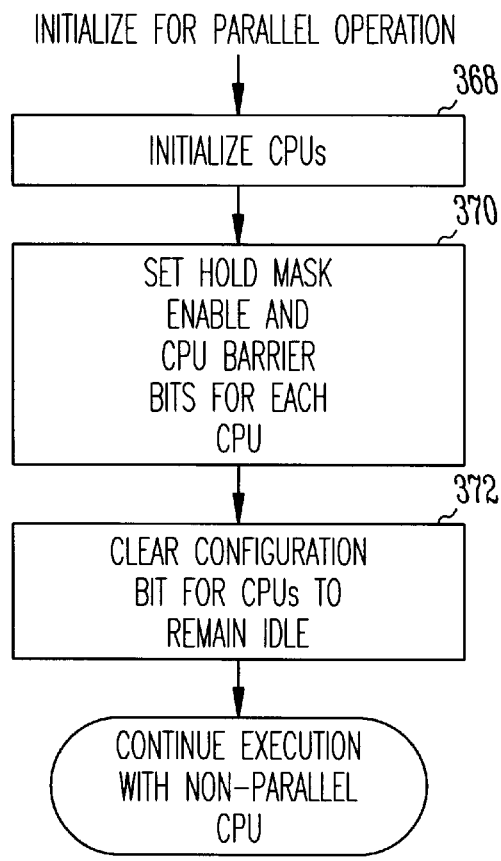
FIGS. 17A and 17B are flowcharts of the process of quickly proceeding from non-parallel to parallel execution in accordance with the present invention.
Figure 17B:
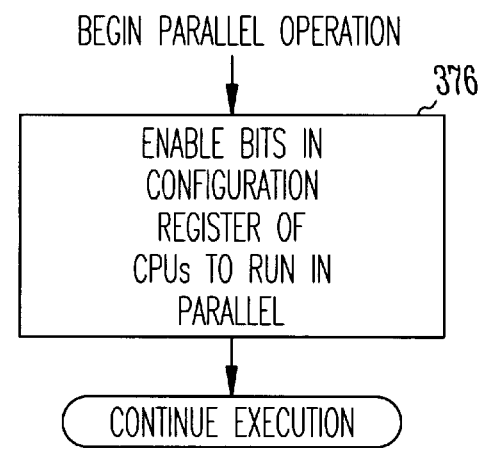

When a transition point from non-parallel to parallel operation is reached, it is desirable to have additional processors running as quickly as possible. The matrix processor system in accordance with the present invention is advantageous in that the system allows quick transition between non-parallel and parallel processing. Such transitions have typically been time consuming, potentially wasting a large portion of the time saved by the parallel processing. FIG. 17A is a flowchart of a transition method in accordance with the present invention. Transition may be accomplished by initializing the various CPUs (block 368) and leaving them at a barrier state by setting the CPU barrier register bits and hold mask enable bits for each CPU as will not initially be running non-parallel portions of code (block 370). Next, in step 372, the configuration register bits are cleared for all the CPUs as will be left idle. At least one CPU may then be left running a non-parallel section of code. With the configuration bits clear for the non-enabled CPUs, any "set my barrier, clear next CPU's barrier" operations will leave the non-configured CPUs alone, since the "next CPU" is determined in accordance with the set bits within the configuration register. Once the lone CPU running the non-parallel section of code reaches a point where parallel operation is called for, the steps 376 according to FIG. 17B are performed wherein the bits within the configuration register are enabled for the CPUs that are to begin running the parallel algorithm. Thereafter, any "set my barrier bit, clear next CPU's barrier" operations quickly bring the previously idle CPUs into operation. Any subset of the available CPUs may be enabled (up to and including all CPUs in the system).

A matrix processor system in accordance with the present invention advantageously performs computationally intensive calculations. The processor utilizes multiple processing elements arranged on multiple buses, each bus having a port connected to a slave port of a crossbar, the crossbar also having master ports connected to a multiport memory system. An interface to external devices is also coupled to a further crossbar port. The memory system supports concurrent accesses to the memory ports with requests for simultaneous access to individual ports being handled in accordance with arbitration.

Buses and associated processors each comprise a node wherein each node includes registers memory mapped within the system address space and accessible by the processing elements on the node without the need to access the memory system. Other processing nodes and external devices may access a node's registers via the mapped addresses. Nodes and processors are configurable into or out of a specific application as desired for providing optimal use of the system.

Operations may be performed by the matrix processor system in a parallel manner, using multiple processors to reach solutions in a shorter time than if solved via non-parallel methods. The matrix processor system enables use of local storage within processing elements, keeping data with a high frequency of reuse within a cache to minimize "expensive" memory accesses whereby faster processing is accomplished. Since operations are computationally intensive, bus accesses by individual processors on a node may be interleaved, and memory system access bandwidth need only be sufficient to support a single processor per memory port so as to provide cost effective computing.

Use of processor and node barrier registers allows synchronization of processors and nodes. Since processors may be included or excluded from active status by updating configuration registers, quick transition from non-parallel to parallel states is possible. Also, the number of processors assigned to a particular task may be easily modified dynamically by software for tailored problem solving.

Matrix processors are suitably configured in coprocessor environments with a general purpose host computer. Tasks requiring intensive computation are assigned to matrix processors, leaving less complex operations to be handled by the general purpose host.

While a preferred embodiment of the present invention has been shown and described, it will be apparent to those skilled in the art that many changes and modifications may be made without departing from the invention in its broader aspects. For example, while the preferred embodiment of the present invention uses the matrix processor in a coprocessor environment, a stand alone version could also be employed. The appended claims are therefore intended to cover all such changes and modifications as fall within the true spirit and scope of the invention.

What is claimed is:

1. A method of synchronizing a plurality of processing elements at a barrier, defined as a point within an algorithm where processors executing an algorithm wait until all other processor executing the algorithm are also waiting at that point, said plurality of processing elements being connected to a plurality of buses, wherein groups of said plurality of processing elements each share access to a corresponding one of the plurality of busses and gain access to the corresponding one of the plurality of bus through a bus protocol, the method comprising the steps of:

synchronizing the processing elements on ones of said plurality of buses at a said barrier, said synchronizing being relative to the other processing elements on said ones of said plurality of buses; and synchronizing said plurality of buses relative to one another to permit simultaneous access to a system memory by at least one of the plurality of processing elements on ones of said buses and at least one of the plurality of processing elements on other ones of said buses.

2. The method according to claim 1 wherein said method is executed by a plurality of said processing elements.

3. The method according to claim 2 wherein said plurality of processing elements execute said method in a concurrent manner.

4. The method according to claim 1 wherein said step of synchronizing the processing elements on ones of said plurality of buses comprises the steps of:

setting a barrier state of ones of said processors when said ones of said processors have executed the algorithm up to the barrier, said barrier state indicating when said processing elements are at a barrier;

reading a barrier state of said plurality of processing elements on a said bus;

checking said barrier state to determine if all processing elements executing the algorithm on said bus are at a barrier state; and continuing said steps of reading and checking said barrier state until all processing elements executing the algorithm on said bus are at the barrier for synchronizing operation of said processing elements.

5. The method according to claim 4 wherein said step of continuing said steps of reading and checking comprises the steps of:

assigning a slave status to said processing elements as they reach said barrier state;

assigning a master status to the last of said processing elements to reach said barrier state; and setting said plurality of processing elements to a non-barrier state, said setting step being performed by said processing element with said master status.

6. The method according to claim 1 wherein said step of synchronizing said plurality of buses comprises the steps of:

setting a bus barrier status to indicate a current bus is at a barrier, wherein a bus is at a barrier when said plurality of processing elements connected to said bus that are executing the algorithm are at a barrier;

reading the barrier status for said plurality of buses;

checking said bus barrier status to determine if said plurality of buses are at a barrier; and continuing said steps of reading and checking said bus barrier status until said plurality of buses are at said barrier state for synchronizing operation of said buses.

7. The method according to claim 6 further comprising the step of clearing said bus barrier status to indicate said plurality of buses are not at a barrier state once said step of continuing checking and reading indicates said plurality of buses are at said barrier state.

8. A digital computer system comprising:

a crossbar interface connected to a main memory;

a first plurality of processing elements;

a first bus connected to and in communication with said first plurality of processing elements, and connected to and in communication with said crossbar interface wherein said first plurality of processors share access to the first bus and gain access to the first bus through a first bus protocol and wherein said main memory is addressable by said first plurality of processing elements via said first bus and said cross bar interface for reading data and writing data;

a second plurality of processing elements;

a second bus connected to and in communication with said second plurality of processing elements, and connected to and in communication with said crossbar interface wherein said second plurality of processors share access to the second bus and gain access to the second bus through a second bus protocol and wherein said main memory is addressable by said second plurality of processing elements via said second bus and said cross bar interface for reading data and writing data;

first synchronization means connected to said first bus for synchronizing operation of said first plurality of processing elements relative to one another for enabling orderly access by said first plurality of processing elements to said first bus for avoiding bus access conflicts on said first bus; and second synchronization means connected to said second bus for synchronizing operation of said second plurality of processing elements relative to one another for enabling orderly access by said second plurality of processing elements to said second bus means for avoiding bus access conflicts on said second bus, wherein said first and second synchronization means operate to permit simultaneous access to the main memory by at least one of the first plurality of processing elements and at least one of the second plurality of processing elements.

9. A digital computer system according to claim 8 wherein said first synchronization means comprise storage means for indicating states corresponding to ones of said first plurality of processing elements as are not allowed to access said first bus, said storage means being read and write accessible by said first plurality of processing elements for setting and clearing said states.

10. A digital computer system according to claim 9 wherein said first synchronization means operates according to a program adapted to run on said first plurality of processing elements, said program being responsive to said storage means for enabling ones of said processing means to access said first bus.

11. A digital computer system according to claim 9 wherein said storage means comprises register means in communication with said first bus.

12. A digital computer system according to claim 8 further comprising configuration storage means for indicating ones of said first plurality of processing elements are enabled for performing an algorithm.

13. A digital computer system according to claim 12 wherein said configuration storage means comprises a configuration register in communication with said first bus for indicating that said ones of said first processing elements are enabled for performing an algorithm.

14. A digital computer system comprising:

a crossbar switch connected to a main memory having a plurality of memory arrays;

a first plurality of processing elements;

first bus means connected to and for communicating with said plurality of processing elements and said crossbar switch, wherein said first plurality of processing elements share access to the first bus means and gain access to the first bus means through a first bus protocol;

at least a second plurality of processing elements;

second bus means connected to and for communicating with said second plurality of processing elements and said crossbar switch, wherein said second plurality of processing elements share access to the second bus means and gain access to the second bus means through a second bus protocol;

first synchronization means connected to first bus means for synchronizing operation of ones of said first plurality of processing elements relative to one another for enabling orderly access by said first processing elements to said first bus means for avoiding bus access conflicts; and second synchronization means connected to second bus means for synchronizing operation of ones of said second plurality of processing elements relative to one another for enabling orderly access by said second processing elements to said second bus means for avoiding bus access conflicts, wherein said first and second synchronization means operate to permit simultaneous access to the main memory by at least one of the first plurality of processing elements and at least one of the second plurality of processing elements.

15. A digital computer system according to claim 14 further wherein said crossbar switch having a plurality of processor ports and a plurality of memory ports, a first said processor port connecting with said first bus means, a second processor port connecting with said second bus means, and said plurality of crossbar memory ports connecting with a plurality of said memory means whereby said crossbar means selectively interconnects ones of said processor ports with ones of said memory means.

16. A digital computer system according to claim 15 further comprising arbitration means for receiving memory access requests from processing elements on said first bus means and from processing elements on said second bus means, said arbitration means arbitrating conflicts in said requests for controlling said crossbar switch for interconnecting said memory means to said first and second bus means.

17. A digital computer system according to claim 15 further comprising interface means coupled to one of said crossbar processor ports for communicating with an external device.

18. A digital computer system according to claim 14 wherein said first and said second processor synchronization means comprise first storage means for indicating states representing that ones of said first plurality of processing elements are not allowed to access said first bus means, and second storage means for indicating states representing that ones of said second plurality of processing elements are not allowed to access said second bus means, said first storage means being read and write accessible by said first plurality of processing elements and said second storage means being read and write accessible by said second plurality of processing elements for setting and clearing said states.

19. A digital computer system according to claim 18 wherein said first storage means comprises first register means and said second storage means comprises second register means, said first register means being in communication with said first bus means and second register means being in communication with said second bus means.

20. A digital computer system according to claim 18 wherein said first synchronization means and said second synchronization means employ a program adapted to be run by said first plurality of processing elements and by said second plurality of processing elements, said program being responsive to said first and second storage means for enabling ones of said first processing means to operate and access said first bus means in an orderly manner and for enabling ones of said second processing means to operate and access said second bus means in an orderly manner.

21. A digital computer system according to claim 14 further comprising means for synchronizing operation said first bus means and said second bus means relative to one another, wherein said first plurality of processing elements on said first bus and said second plurality of processing elements on said second bus are held from continuing execution of an algorithm until all said processing elements have completed performing a specified portion of said algorithm.

22. A digital computer system according to claim 21 wherein said means for synchronizing operation of said first bus means and said second bus means comprises bus barrier indication means for representing when each of said first plurality of processing elements and each of said second plurality of processing elements are at a barrier, defined as a point within an algorithm where processing elements wait until other processing elements performing the algorithm are also waiting at that point.

23. A digital computer system according to claim 22 wherein said bus barrier indication means comprises register means in communication with said first and said second bus means.

24. A digital computer system according to claim 22 wherein said first and said second synchronization means are operated according to a program adapted to be run by said first and said second plurality of processing elements, said program being responsive to said bus barrier indication means for enabling and disabling access to said first and second bus means by ones of said processing elements.

25. A digital computer system according to claim 14 further comprising configuration means for indicating that ones of said first and said second plurality of processing elements are enabled for performing an algorithm.

26. A digital computer system according to claim 25 wherein said configuration means comprises:
first configuration register means in communication with said first bus means for indicating ones of said first processing elements are enabled for performing an algorithm; and
second configuration register means in communication with said second bus means for indicating ones of said second processing elements are enabled for performing an algorithm.

27. A computer system comprising:
a general purpose computer;
a system memory;
at least one matrix processing means adapted for processing highly computationally intensive operations; and
a system interface for interconnecting and transferring data between said general purpose computer, said system memory and said at least one matrix processing means,
said at least one matrix processing means comprising:
a first bus,
a second bus,
multiple memory ports connected to the system memory for providing concurrent memory accesses to the system memory,
a crossbar having a first plurality of I/O ports, ones of said first I/O ports being connected to said at least one bus, said crossbar having a second plurality of I/O ports connected to ones of the multiple memory ports, said crossbar interconnecting ones of said first I/O ports with ones of said second I/O ports for interconnecting said at least one bus with said system memory, and
a first plurality of processing elements connected to and in communication with said first bus, wherein said first plurality of processing elements share access to said first bus and gain access to said first bus through a first bus protocol
a second plurality of processing elements connected to and in communication with said second bus, wherein said second plurality of processing elements share access to said second bus and gain access to said second bus through a second bus protocol, and
synchronization means for synchronizing the first plurality of processing elements on said first bus and the second plurality of processing elements on said second bus to avoid bus access conflicts on said first and second busses and for further synchronizing said first and second busses relative to one another to permit simultaneous access to the system memory by at least one of the first plurality of processing elements and at least one of the second plurality of processing elements.

28. A computer system according to claim 27 further comprising vector processing means for processing moderately computationally intensive operations, said system interface means also interconnecting said vector processing means with said general purpose computer, said system memory and said at least one matrix processing means for transferring data therebetween.

29. A computer system according to claim 27 further comprising arbitration means for arbitrating access to said memory means among said first and second busses.

30. A multiprocessor computer system comprising:
a plurality of buses;
a plurality of processing elements capable of concurrent data processing wherein multiple ones of said processing elements connect to ones of said buses, wherein the ones of said processing elements share access to the ones of said buses and gain access to the ones of said busses through a bus protocol;
a memory array comprising multiple memory ports for enabling concurrent memory access to separate memory address locations;
a crossbar switch for concurrently connecting ones of said buses to ones of said memory ports for enabling data exchanges therebetween;
a plurality of control register arrays, ones of said control register arrays being coupled to ones of said buses, wherein each of said control register arrays comprise:
an activation register wherein ones of said processing elements connected to ones of said data transfer buses are assigned activation bits in said activation register, and
means connected to said activation register for setting and clearing said activation bits so that setting said activation bits enables the associated processing element for performing an algorithm and clearing said activation bits disables the associated processing element from performing an algorithm; and synchronization means for synchronizing a plurality of processing elements on ones of said buses relative to a plurality of processing elements on other ones of said buses to permit simultaneous access to the system memory by at least one of the plurality of processing elements on the ones of said buses and at least one of the plurality of processing elements on the other ones of said buses.

31. A multiprocessor computer system according to claim 30 further comprising:

a multiple bus arbitrator for preventing simultaneous bus access to the same memory port by multiple buses, said arbitrator including priority assignment means for associating a priority value to ones of said buses; and means for controlling said crossbar switch so that more than one of said buses accessing the same memory port are connected to said memory port in order in accordance with the priority value from said priority assignment means.

32. A multiprocessor computer system according to claim 30 further comprising processor synchronization means wherein said processing elements on ones of said buses are responsive to said processor synchronization means for enabling said processing elements to idle in a processing state and concurrently monitor said control register array until a plurality of processing elements on said buses are also idling.

* * * * *

UNITED STATES PATENT AND TRADEMARK OFFICE
CERTIFICATE OF CORRECTION

PATENT NO. : 6,282,583 B1
DATED : August 28, 2001
INVENTOR(S) : Philip A. Pincus, Alan E. Charlesworth and Bradley R. Carlile It is certified that error appears in the above-identified patent and that said Letters Patent is hereby corrected as shown below:

Column 5,
Line 41, tab "cycles" to the right and align it directly under "process".

Column 12,
Line 59, delete "(PL1BE*" and insert -- (P1BE* --, therefor.

Signed and Sealed this

Seventh Day of May, 2002

*Attest:*

JAMES E. ROGAN
*Director of the United States Patent and Trademark Office*

*Attesting Officer*